(12) United States Patent
McAlister

(10) Patent No.: US 9,309,846 B2
(45) Date of Patent: Apr. 12, 2016

(54) MOTION MODIFIERS FOR FUEL INJECTION SYSTEMS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/279,175

(22) Filed: May 15, 2014

(65) Prior Publication Data

US 2015/0069144 A1   Mar. 12, 2015

Related U.S. Application Data

(63) Continuation-in-part of application No. 13/843,197, filed on Mar. 15, 2013, now abandoned, and a continuation-in-part of application No. 13/839,178, filed on Mar. 15, 2013, now abandoned.

(Continued)

(51) Int. Cl.
  *F02B 5/00* (2006.01)
  *F02M 51/06* (2006.01)
  (Continued)

(52) U.S. Cl.
  CPC ....... *F02M 51/0603* (2013.01); *F02M 21/0206* (2013.01); *F02M 21/026* (2013.01);
  (Continued)

(58) Field of Classification Search
  CPC ............ F02M 57/025; F02M 51/0603; F02M 63/0007; F02M 63/0026; F02M 2200/304
  USPC ............ 239/88, 585.5, 585.1, 533.3; 123/305
  See application file for complete search history.

(56) References Cited

U.S. PATENT DOCUMENTS 802,946 A    10/1905  Waterman
1,451,384 A   4/1923  Whyte
(Continued)

FOREIGN PATENT DOCUMENTS

DE        3443022 A1    5/1986
DE   102005060139 A1    6/2007
(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.
(Continued)

*Primary Examiner* — Marguerite McMahon
*Assistant Examiner* — James Kim
(74) *Attorney, Agent, or Firm* — Perkins Coie LLP

(57) ABSTRACT

The present technology relates generally to amplification for fuel injectors. In some embodiments, an injector for introducing gaseous or liquid fuel into a combustion chamber includes an injector body having a base portion configured to receive fuel into the body and a valve coupled to the body. The valve can be movable to an open position to introduce fuel into the combustion chamber. The injector further includes a valve operator assembly. The valve operator assembly can include a valve actuator coupled to the valve and movable between a first position and a second position upon receipt of an initial motion. The valve operator assembly can also include an amplifier configured to receive the initial motion from the valve actuator, amplify the initial motion, and transfer the amplified motion to the valve.

12 Claims, 18 Drawing Sheets

Related U.S. Application Data

(60) Provisional application No. 61/989,325, filed on May 6, 2014, provisional application No. 61/725,448, filed on Nov. 12, 2012, provisional application No. 61/725,446, filed on Nov. 12, 2012.

(51) Int. Cl.

| | | |
|---|---|---|
| *F02M 57/06* | (2006.01) | |
| *F02M 21/02* | (2006.01) | |
| *F02M 21/06* | (2006.01) | |
| *F02M 61/08* | (2006.01) | |
| *F02D 41/30* | (2006.01) | |
| *F02D 41/20* | (2006.01) | |
| *F02D 41/00* | (2006.01) | |

(52) U.S. Cl.
CPC .......... *F02M21/0251* (2013.01); *F02M 21/06* (2013.01); *F02M 57/06* (2013.01); *F02M 61/08* (2013.01); *F02D 41/0027* (2013.01); *F02D 41/20* (2013.01); *F02D 41/2096* (2013.01); *F02D 41/3005* (2013.01); *F02M 2200/304* (2013.01); *F02M 2200/50* (2013.01); *F02M 2200/701* (2013.01); *F02M 2200/703* (2013.01); *Y02T 10/32* (2013.01)

(56) References Cited

U.S. PATENT DOCUMENTS

| | | |
|---|---|---|
| 1,765,237 A | 6/1930 | King |
| 2,255,203 A | 9/1941 | Wiegand |
| 2,630,761 A | 3/1953 | Mashinter |
| 2,721,100 A | 10/1955 | Bodine, Jr. |
| 3,058,453 A | 10/1962 | May |
| 3,060,912 A | 10/1962 | May |
| 3,081,758 A | 3/1963 | May |
| 3,105,640 A | 10/1963 | Allen |
| 3,243,335 A | 3/1966 | Faile |
| 3,373,724 A | 3/1968 | Papst |
| 3,520,961 A | 7/1970 | Suda et al. |
| 3,542,293 A | 11/1970 | Bishop et al. |
| 3,594,877 A | 7/1971 | Suda et al. |
| 3,608,050 A | 9/1971 | Carman et al. |
| 3,614,486 A | 10/1971 | Smiley |
| 3,689,293 A | 9/1972 | Beall |
| 3,760,588 A * | 9/1973 | Kustusch ............... F15B 7/00 254/93 R |
| 3,875,612 A | 4/1975 | Poitras |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,020,803 A | 5/1977 | Thuren et al. |
| 4,066,046 A | 1/1978 | McAlister |
| 4,095,580 A | 6/1978 | Murray et al. |
| 4,101,076 A | 7/1978 | Bart |
| 4,122,816 A | 10/1978 | Fitzgerald et al. |
| 4,135,481 A | 1/1979 | Resler, Jr. |
| 4,203,393 A | 5/1980 | Giardini |
| 4,281,797 A | 8/1981 | Kimata et al. |
| 4,330,732 A | 5/1982 | Lowther |
| 4,332,223 A | 6/1982 | Dalton |
| 4,364,342 A | 12/1982 | Asik |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,544,096 A | 10/1985 | Burnett |
| 4,567,857 A | 2/1986 | Houseman et al. |
| 4,574,037 A | 3/1986 | Samejima et al. |
| 4,667,511 A | 5/1987 | Mausner |
| 4,677,960 A | 7/1987 | Ward |
| 4,684,211 A | 8/1987 | Weber et al. |
| 4,688,538 A | 8/1987 | Ward et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,805,573 A | 2/1989 | MacFarlane et al. |
| 4,834,033 A | 5/1989 | Larsen |
| 4,841,925 A | 6/1989 | Ward |
| 4,846,217 A | 7/1989 | Breslau |
| 4,877,187 A | 10/1989 | Daly |
| 4,905,962 A | 3/1990 | Iljin |
| 4,922,883 A | 5/1990 | Iwasaki |
| 4,949,936 A | 8/1990 | Messina et al. |
| 4,958,774 A | 9/1990 | Taylor |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,055,435 A | 10/1991 | Hamanaka et al. |
| 5,056,496 A | 10/1991 | Morino et al. |
| 5,076,223 A | 12/1991 | Harden et al. |
| 5,094,429 A | 3/1992 | Dostert |
| 5,095,742 A | 3/1992 | James et al. |
| 5,109,817 A | 5/1992 | Cherry |
| 5,131,376 A | 7/1992 | Ward et al. |
| 5,163,623 A | 11/1992 | Seino |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,226,628 A | 7/1993 | Daly |
| 5,267,601 A | 12/1993 | Dwivedi |
| 5,297,518 A | 3/1994 | Cherry |
| 5,305,360 A | 4/1994 | Remark et al. |
| 5,325,888 A | 7/1994 | Stary |
| 5,328,094 A | 7/1994 | Goetzke et al. |
| 5,329,606 A | 7/1994 | Andreassen |
| 5,377,633 A | 1/1995 | Wakeman |
| 5,388,984 A | 2/1995 | Meslif |
| 5,392,745 A | 2/1995 | Beck |
| 5,421,299 A | 6/1995 | Cherry |
| 5,427,132 A | 6/1995 | Fenner, Jr. |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,549,746 A | 8/1996 | Scott et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,662,389 A | 9/1997 | Truglio et al. |
| 5,676,026 A | 10/1997 | Tsuboi et al. |
| 5,697,554 A | 12/1997 | Auwaerter et al. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,704,553 A | 1/1998 | Wieczorek et al. |
| 5,715,788 A | 2/1998 | Tarr et al. |
| 5,738,818 A | 4/1998 | Atmur et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |

(56) References Cited

U.S. PATENT DOCUMENTS

| | | | |
|---|---|---|---|
| 5,876,659 A | 3/1999 | Yasutomi et al. |
| 5,915,272 A | 6/1999 | Foley et al. |
| 5,941,207 A | 8/1999 | Anderson et al. |
| 6,017,390 A | 1/2000 | Charych et al. |
| 6,026,568 A | 2/2000 | Atmur et al. |
| 6,042,028 A | 3/2000 | Xu |
| 6,062,498 A | 5/2000 | Klopfer |
| 6,081,183 A | 6/2000 | Mading et al. |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,138,639 A | 10/2000 | Hiraya et al. |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,311,950 B1 | 11/2001 | Kappel et al. |
| 6,335,065 B1 | 1/2002 | Steinlage et al. |
| 6,360,721 B1 | 3/2002 | Schuricht et al. |
| 6,371,439 B1 | 4/2002 | Trevisan |
| 6,374,781 B1 | 4/2002 | Kato |
| 6,378,485 B2 | 4/2002 | Elliott |
| 6,386,178 B1 | 5/2002 | Rauch |
| 6,450,424 B1 | 9/2002 | Horbelt |
| 6,453,660 B1 | 9/2002 | Johnson et al. |
| 6,455,173 B1 | 9/2002 | Marijnissen et al. |
| 6,478,007 B2 | 11/2002 | Miyashita et al. |
| 6,494,382 B1 | 12/2002 | Stier |
| 6,506,336 B1 | 1/2003 | Beall et al. |
| 6,517,011 B1 | 2/2003 | Ayanji et al. |
| 6,520,434 B1 | 2/2003 | Reiter |
| 6,531,712 B1 | 3/2003 | Boecking |
| 6,532,315 B1 | 3/2003 | Hung et al. |
| 6,567,599 B2 | 5/2003 | Hung |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,595,436 B2 | 7/2003 | Kirzhner et al. |
| 6,615,899 B1 | 9/2003 | Woodward et al. |
| 6,621,964 B2 | 9/2003 | Quinn et al. |
| 6,663,027 B2 | 12/2003 | Jameson et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Enomoto et al. |
| 6,722,340 B1 | 4/2004 | Sukegawa et al. |
| 6,725,826 B2 | 4/2004 | Esteghlal |
| 6,745,744 B2 | 6/2004 | Suckewer et al. |
| 6,749,043 B2 | 6/2004 | Brown et al. |
| 6,752,324 B1 | 6/2004 | Mattes |
| 6,755,175 B1 | 6/2004 | McKay et al. |
| 6,763,811 B1 | 7/2004 | Tamol, Sr. |
| 6,779,513 B2 | 8/2004 | Pellizzari et al. |
| 6,787,973 B2 | 9/2004 | Frank et al. |
| 6,811,103 B2 | 11/2004 | Gurich et al. |
| 6,814,313 B2 | 11/2004 | Petrone et al. |
| 6,832,588 B2 | 12/2004 | Herden et al. |
| 6,840,493 B2 | 1/2005 | York et al. |
| 6,845,920 B2 | 1/2005 | Sato et al. |
| 6,851,413 B1 | 2/2005 | Tamol, Sr. |
| 6,871,630 B2 | 3/2005 | Herden et al. |
| 6,871,833 B1 | 3/2005 | Zeh et al. |
| 6,883,474 B2 | 4/2005 | Bucknor |
| 6,883,490 B2 | 4/2005 | Jayne |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,938,597 B2 | 9/2005 | Klein et al. |
| 6,940,213 B1 | 9/2005 | Heinz et al. |
| 6,976,683 B2 | 12/2005 | Eckert et al. |
| 6,994,073 B2 | 2/2006 | Tozzi et al. |
| 7,007,658 B1 | 3/2006 | Cherry et al. |
| 7,013,863 B2 | 3/2006 | Shiraishi et al. |
| 7,025,358 B2 | 4/2006 | Ueta et al. |
| 7,032,833 B2 | 4/2006 | Bocking |
| 7,032,845 B2 | 4/2006 | Dantes et al. |
| 7,066,399 B2 | 6/2006 | Hohl |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,083,114 B2 | 8/2006 | Maeurer et al. |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,140,347 B2 | 11/2006 | Suzuki et al. |
| 7,140,562 B2 | 11/2006 | Holzgrefe et al. |
| 7,204,581 B2 * | 4/2007 | Peeters ............... B01L 3/0268 137/827 |
| 7,213,613 B2 | 5/2007 | Spakowski et al. |
| 7,214,883 B2 | 5/2007 | Leyendecker |
| 7,225,790 B2 | 6/2007 | Bartunek et al. |
| 7,249,578 B2 | 7/2007 | Fricke et al. |
| 7,255,290 B2 | 8/2007 | Bright et al. |
| 7,267,111 B2 | 9/2007 | Liskow |
| 7,278,392 B2 | 10/2007 | Zillmer et al. |
| 7,305,971 B2 | 12/2007 | Fujii |
| 7,309,032 B2 | 12/2007 | Fischer et al. |
| 7,418,940 B1 | 9/2008 | Yi et al. |
| 7,419,103 B2 | 9/2008 | Pauer |
| 7,481,043 B2 | 1/2009 | Hirata et al. |
| 7,554,250 B2 | 6/2009 | Kadotani et al. |
| 7,625,531 B1 | 12/2009 | Coates et al. |
| 7,626,315 B2 | 12/2009 | Nagase |
| 7,650,873 B2 | 1/2010 | Hofbauer et al. |
| 7,651,039 B2 | 1/2010 | Suzuki |
| 7,694,855 B2 | 4/2010 | Chastine et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,728,489 B2 | 6/2010 | Heinz et al. |
| 7,849,833 B2 | 12/2010 | Toyoda |
| 7,850,091 B2 | 12/2010 | Boecking |
| 7,918,212 B2 | 4/2011 | Verdejo et al. |
| 7,938,102 B2 | 5/2011 | Sherry |
| 7,946,509 B2 * | 5/2011 | Boecking ............ F02M 47/027 123/445 |
| 8,069,836 B2 | 12/2011 | Ehresman |
| 8,074,625 B2 | 12/2011 | McAlister |
| 8,191,860 B2 | 6/2012 | Eschborn et al. |
| 8,267,063 B2 | 9/2012 | McAlister |
| 8,297,254 B2 | 10/2012 | McAlister |
| 8,311,723 B2 | 11/2012 | McAlister |
| 2002/0017573 A1 | 2/2002 | Sturman |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0162900 A1 | 11/2002 | Boecking |
| 2003/0038259 A1 | 2/2003 | Boecking |
| 2003/0160202 A1 | 8/2003 | Boecking |
| 2003/0192965 A1 | 10/2003 | Maier et al. |
| 2004/0008989 A1 | 1/2004 | Hung |
| 2005/0098663 A1 | 5/2005 | Ishii |
| 2005/0255011 A1 | 11/2005 | Greathouse et al. |
| 2006/0005738 A1 | 1/2006 | Kumar |
| 2006/0005739 A1 | 1/2006 | Kumar |
| 2006/0108452 A1 | 5/2006 | Anzinger et al. |
| 2006/0237220 A1 | 10/2006 | Leyendecker |

(56) References Cited

U.S. PATENT DOCUMENTS

| | | |
|---|---|---|
| 2006/0255185 A1 | 11/2006 | Cristiani et al. |
| 2007/0189114 A1 | 8/2007 | Reiner et al. |
| 2008/0041344 A1 | 2/2008 | Wing et al. |
| 2009/0078798 A1 | 3/2009 | Gruendl et al. |
| 2009/0093951 A1 | 4/2009 | McKay et al. |
| 2009/0200406 A1 | 8/2009 | Kronberger |
| 2009/0212127 A1 | 8/2009 | Reynolds et al. |
| 2011/0272499 A1 | 11/2011 | Venkataraghavan et al. |
| 2012/0048239 A1 | 3/2012 | Jalal et al. |
| 2012/0145125 A1 | 6/2012 | McAlister |
| 2012/0204831 A1 | 8/2012 | McAlister |

FOREIGN PATENT DOCUMENTS

| | | |
|---|---|---|
| DE | 102006037040 | 7/2008 |
| EP | 1209351 A1 | 5/2002 |
| EP | 2402587 | 12/2012 |
| GB | 1038490 A | 8/1966 |
| JP | 2001-512564 A | 8/2001 |
| JP | 2006-97659 | 4/2006 |
| JP | 2006-105067 A | 4/2006 |
| JP | 2008-31853 | 2/2008 |
| JP | 2008-520888 A | 6/2008 |
| WO | WO-9407022 A1 | 3/1994 |
| WO | WO-2008-017576 A1 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Birchenough, Arthur G. "A Sustained-arc Ignition System for Internal Combustion Engines." Nasa Technical Memorandum (NASA TM-73833). Lewis Research Center. Nov. 1977. pp. 1-15.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 1-9.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

International Search Report and Written Opinion for Application No. PCT/US2013/069740; Applicant: McAlister Technologies, LLC.; Date of Mailing: Feb. 7, 2014, 16 pages.

* cited by examiner

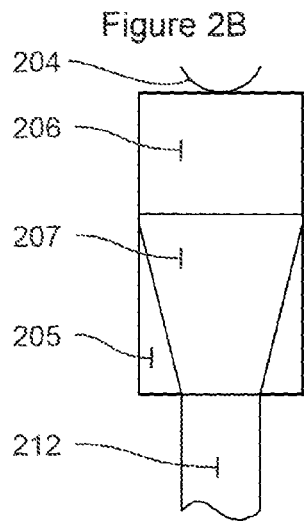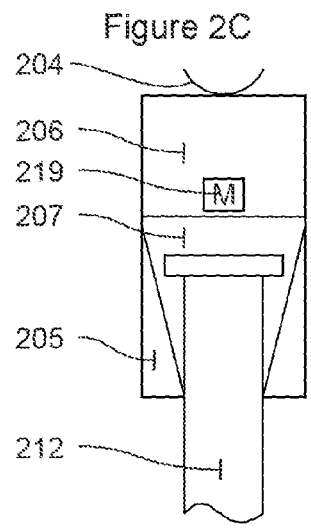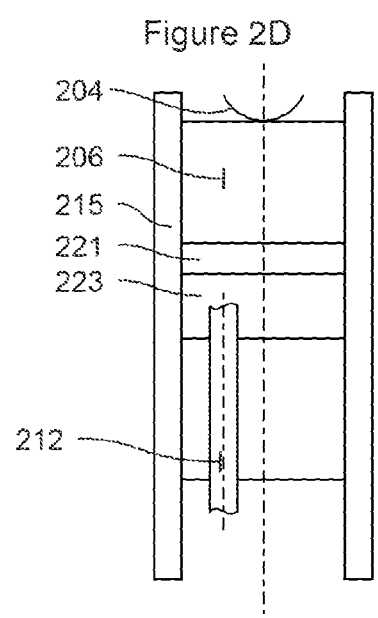

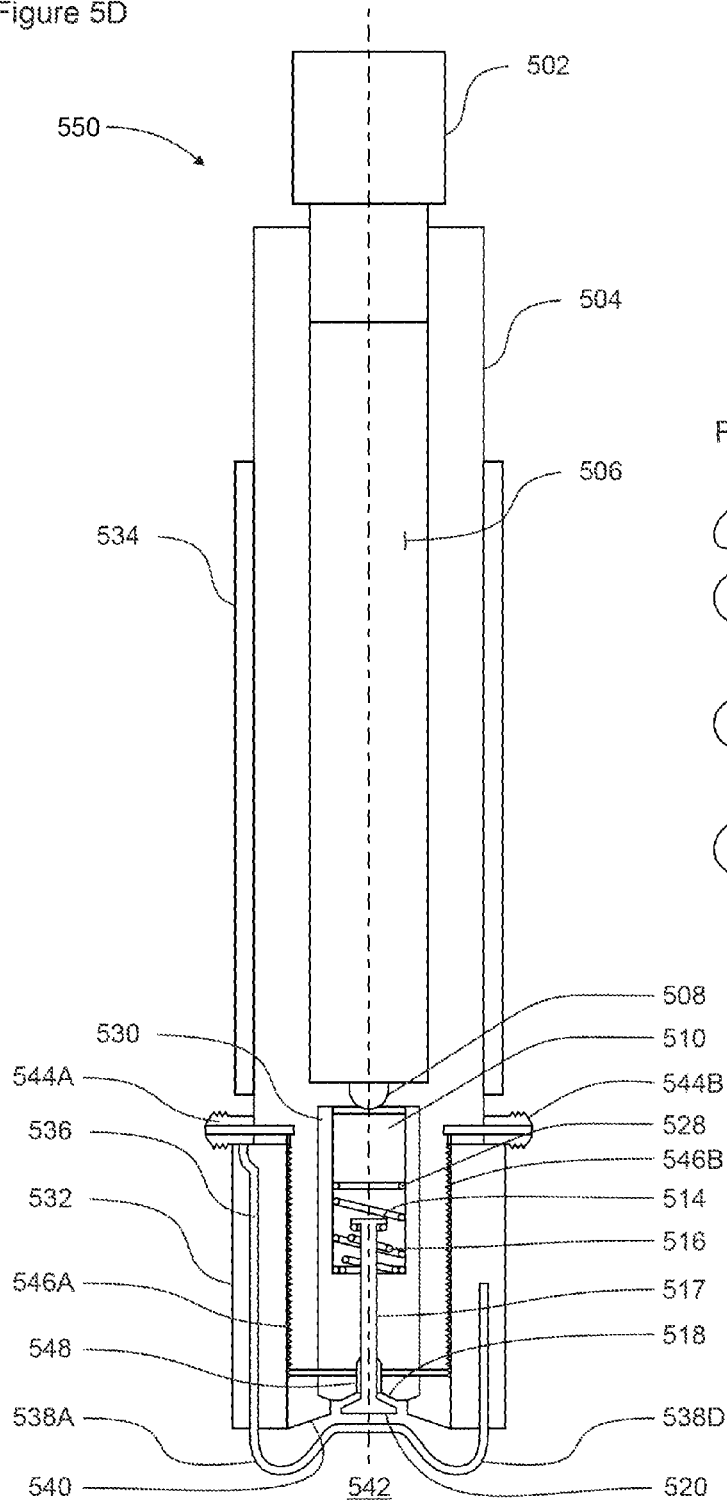
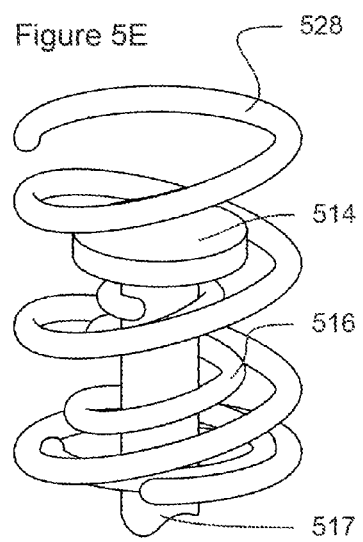

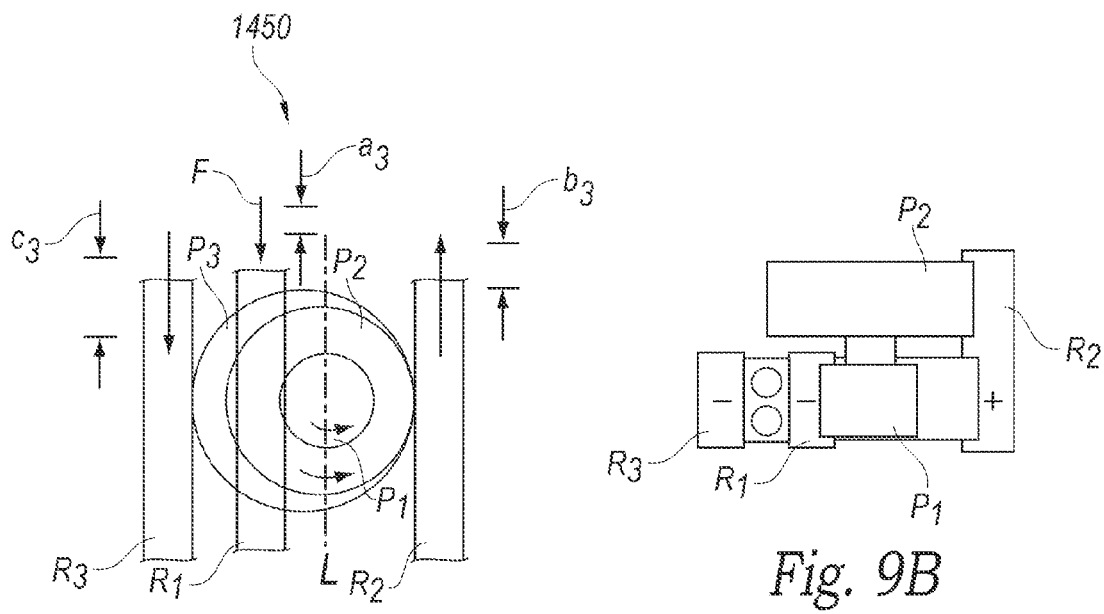
Fig. 9A
Fig. 9B
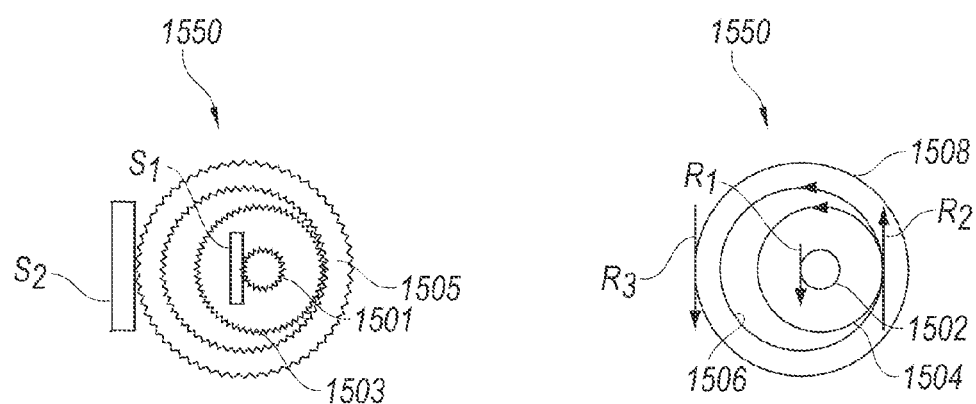
Fig. 10A
Fig. 10B
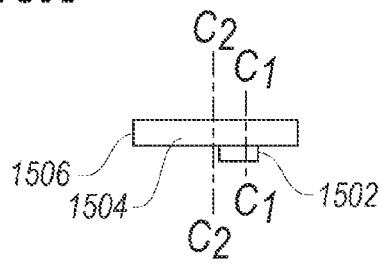
Fig. 10C

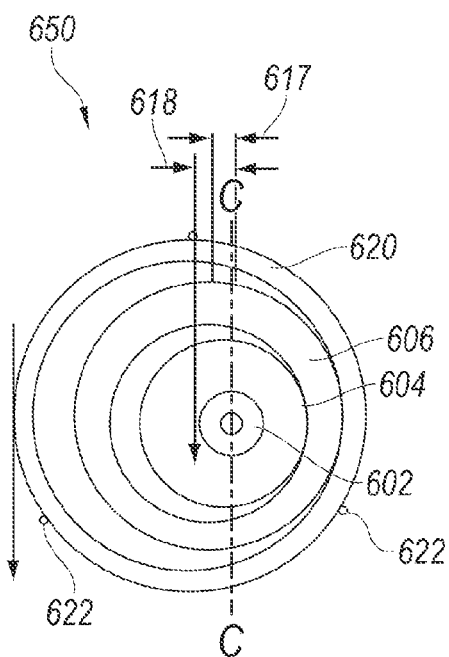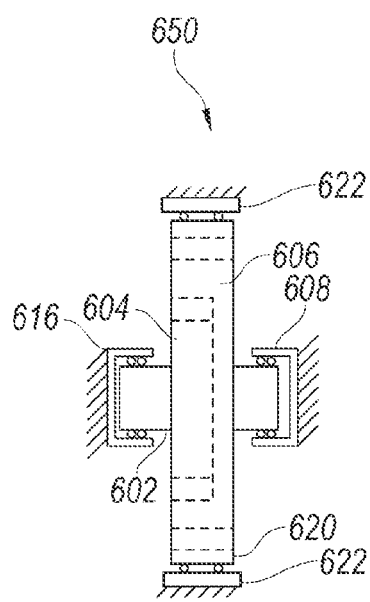
Fig. 11A  Fig. 11B
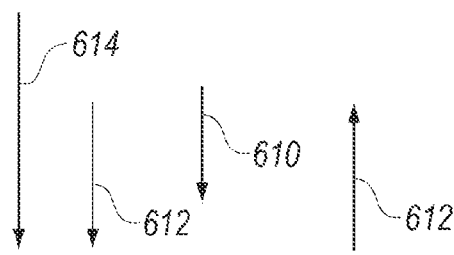
Fig. 11C

MOTION MODIFIERS FOR FUEL INJECTION SYSTEMS

CROSS-REFERENCE TO RELATED APPLICATION(S)

The present application claims priority to and the benefit of U.S. Provisional Patent Application No. 61/989,325, filed May 6, 2014. The present application is a continuation-in-part of U.S. patent application Ser. No. 13/843,197, filed Mar. 15, 2013, which claims priority to and the benefit of U.S. Provisional Patent Application No. 61/725,448, filed Nov. 12, 2012, and also is a continuation-in-part of U.S. patent application Ser. No. 13/839,178, filed Mar. 15, 2013, which claims priority to and the benefit of U.S. Provisional Patent Application No. 61/725,446, filed Nov. 12, 2012. All the aforementioned patent applications are hereby incorporated by reference in their entireties.

TECHNICAL FIELD

The present disclosure is generally related to motion and/or displacement modifiers (e.g., displacement amplifiers, displacement dampeners) for use in applications including fuel injection systems, and associated systems and methods. Particular embodiments include, but are not limited to, hydraulic displacement, mechanical motion, and/or spring displacement (e.g., including elastomeric and/or ferrofluid) amplifiers and/or dampeners. Applications can include direct injection of gaseous fuels into internal combustion engines of various combustion chamber sizes, piston speeds, cylinders, and/or compression ratios.

BACKGROUND

Fuel injection systems are typically used to inject a fuel spray into an inlet manifold and/or directly into a combustion chamber of an engine. Fuel injection systems have become the primary fuel delivery system used in automotive engines, effectively replacing carburetors. Fuel injectors used in these fuel injection systems are generally capable of two basic functions. First, they deliver a metered amount of fuel for each combustion cycle of the engine. Second, they disperse the fuel to improve the efficiency of the combustion process. In many instances fuel injection systems are connected to a pressurized fuel supply, and the fuel can be metered into the combustion chamber by varying the pressure, flow impedance and/or time during which the injector metering valve is opened from a normally closed position. The fuel can also be dispersed into the combustion chamber by forcing the fuel through one or more small orifices in the injectors or a conduit connected (e.g., coupled, positioned or extending within) to the injector.

SUMMARY

Various embodiments of the fuel injection system or injector can include any one, or any combination, of any of the following. In some embodiments, the injector for introducing fuel into a combustion chamber includes an injector body including a base portion configured to receive fuel into the body and a valve coupled to the body. Wherein the valve is movable toward an open position to introduce fuel into the combustion chamber. The injector further includes a valve operator assembly that includes a valve actuator coupled to the valve and movable from a first position to a second position upon receipt of an initial motion and a motion modifier (e.g., amplifier, dampener) configured to receive the initial motion from the valve actuator, alter (e.g., amplify, dampen) the initial motion, and transfer the altered (e.g., amplified, dampened) motion to the valve.

Certain embodiments of the fuel injection system or injector can include any one, or any combination, of any of the following. In some embodiments, the injector includes a prime mover coupled to the valve actuator and configured to supply the initial motion to the valve actuator. Wherein the prime mover includes at least one of a: piezoelectric, magnetostrictive, electromagnetic, electromechanical, pneumatic, and hydraulic force generator. In some embodiments, the injector includes a dampener configured to modify (e.g., truncate) motion of the valve. In some embodiments, the injector includes a component (e.g., dampener) configured to truncate motion of the valve.

Some embodiments of the fuel injection system or injector can include any one, or any combination, of any of the following. In some embodiments, the amplifier is configured to amplify the motion to the valve in a first cycle and a dampener is configured to dampen the motion to the valve in a second cycle. In some embodiments, the amplifier includes a hydraulic displacement amplifier having a plurality of operably connected pistons. Wherein a first piston has a different cross-sectional area than a second piston.

Various embodiments of the fuel injection system or injector can include any one, or any combination, of any of the following. In some embodiments, the amplifier includes a mechanical motion amplifier having a mechanical stroke modifier configured to alter at least one of a direction or magnitude of the initial motion and convey the altered motion to the valve actuator. In some embodiments, the amplifier includes an elastomeric displacement amplifier having an elastomeric component configured to receive the initial motion from the valve actuator, amplify the initial motion, and transfer the amplified motion to the valve.

Certain embodiments of the fuel injection system or injector can include any one, or any combination, of any of the following. In some embodiments, the amplifier includes a ferrofluidic motion amplifier comprising a ferrofluid filled component configured to receive the initial motion from the valve actuator, amplify the initial motion, and transfer the amplified motion to the valve.

Some embodiments of the fuel injection system or injector can include any one, or any combination, of any of the following. In some embodiments, an injector for introducing fuel into a combustion chamber includes an injector body including a base portion configured to receive fuel into the body and a valve coupled to the body. Wherein the valve is movable to an open position to introduce fuel into the combustion chamber. The injector further includes a valve operator assembly. The valve operator assembly includes a driver, a movable component, a displacement amplifier having an elastomeric component coupled to the valve, and a piston having a first end in contact with the movable component and second end in contact with the elastomeric component. Wherein the driver applies a force upon the movable component to axially move the piston by a first displacement and wherein the elastomeric component is configured to transfer motion of the piston by the first displacement to the valve and axially move the valve by a second displacement greater than the first displacement.

Various embodiments of the fuel injection system or injector can include any one, or any combination, of any of the following. In some embodiments, the movable component is preloaded against a first end of the piston and a second end of the piston is preloaded against the elastomeric component. In some embodiments, the elastomeric component is configured to deform upon application of the force on the piston by the driver and is configured to return to an original dimension upon release of the force. In some embodiments, a ratio of a cross-sectional area of the piston to a cross-sectional area of a valve stem in contact with the elastomeric component determines a displacement amplification and/or dampening factor or ratio. In some embodiments, the second displacement is a range of 1.5 to 10 times greater than the first displacement. In some embodiments, the elastomeric component includes two or more materials. In some embodiments, the elastomeric component includes a spring. In some embodiments, the driver includes a piezoelectric assembly and a value of the first displacement is controlled by the amount of voltage applied to the piezoelectric assembly.

Some embodiments of the fuel injection system or injector can include any one, or any combination, of any of the following. In some embodiments, an injector for introducing fuel into a combustion chamber includes an injector body including a base portion configured to receive fuel into the body and a valve coupled to the body. Wherein the valve is movable to an open position to introduce fuel into the combustion chamber. The injector further includes a valve operator assembly. The valve operator assembly includes a driver, a movable component, a displacement amplifier having a ferrofluid filled component coupled to the valve, and a piston having a first end in contact with the movable component and second end in contact with the ferrofluid filled component. Wherein the driver applies a force upon the movable component to axially move the piston by a first displacement and wherein the ferrofluid filled component is configured to transfer motion of the piston by the first displacement to the valve and axially move the valve by a second displacement greater than the first displacement.

Certain embodiments of the fuel injection system or injector can include any one, or any combination, of any of the following. In some embodiments, the piston includes one or more magnets configured to orient particles of the ferrofluid filled component. In some embodiments, the one or more magnets are configured to provide magnetic attraction of the valve to a closed position as the piston returns to the closed position. In some embodiments, the driver includes a piezoelectric assembly and a value of the first displacement is controlled by the amount of voltage applied to the piezoelectric assembly.

BRIEF DESCRIPTION OF THE DRAWINGS

FIG. 2B is a cross-sectional side view of selected exemplary components of a displacement amplifier and/or dampener configured in accordance with embodiments of the technology.

FIG. 2C is a cross-sectional side view of selected exemplary components of a displacement amplifier and/or dampener configured in accordance with embodiments of the technology.

FIG. 2D is a cross-sectional side view of a selected exemplary components of a displacement amplifier and/or dampener configured in accordance with embodiments of the technology.

FIG. 5D is a cross-sectional side view of an assembly of selected exemplary components of a displacement amplifier and/or dampener configured in accordance with embodiments of the technology.

FIG. 5E is a magnified view of portions of the fuel injector assembly of FIG. 5D configured in accordance with embodiments of the technology.

FIG. 9A is a side view of a mechanical stroke modifier configured in accordance with embodiments of the technology.

FIG. 9B is an end view of the mechanical stroke modifier of FIG. 9A.

FIG. 10A is a side view of a mechanical stroke modifier configured in accordance with embodiments of the technology.

FIG. 10B is a partially schematic side view of the mechanical stroke modifier of FIG. 10A showing pitch diameters and unidirectional motions in accordance with embodiments of the technology.

FIG. 10C is a top view of the mechanical stroke modifier of FIG. 10B.

FIG. 11A is a side view of a mechanical stroke modifier configured in accordance with embodiments of the technology.

FIG. 11B is a top view of the mechanical stroke modifier of FIG. 11A.

FIG. 11C is an illustration of vectors representing the direction and magnitude of motion within the mechanical stroke modifier of FIG. 11A.

DETAILED DESCRIPTION

Figure 1:
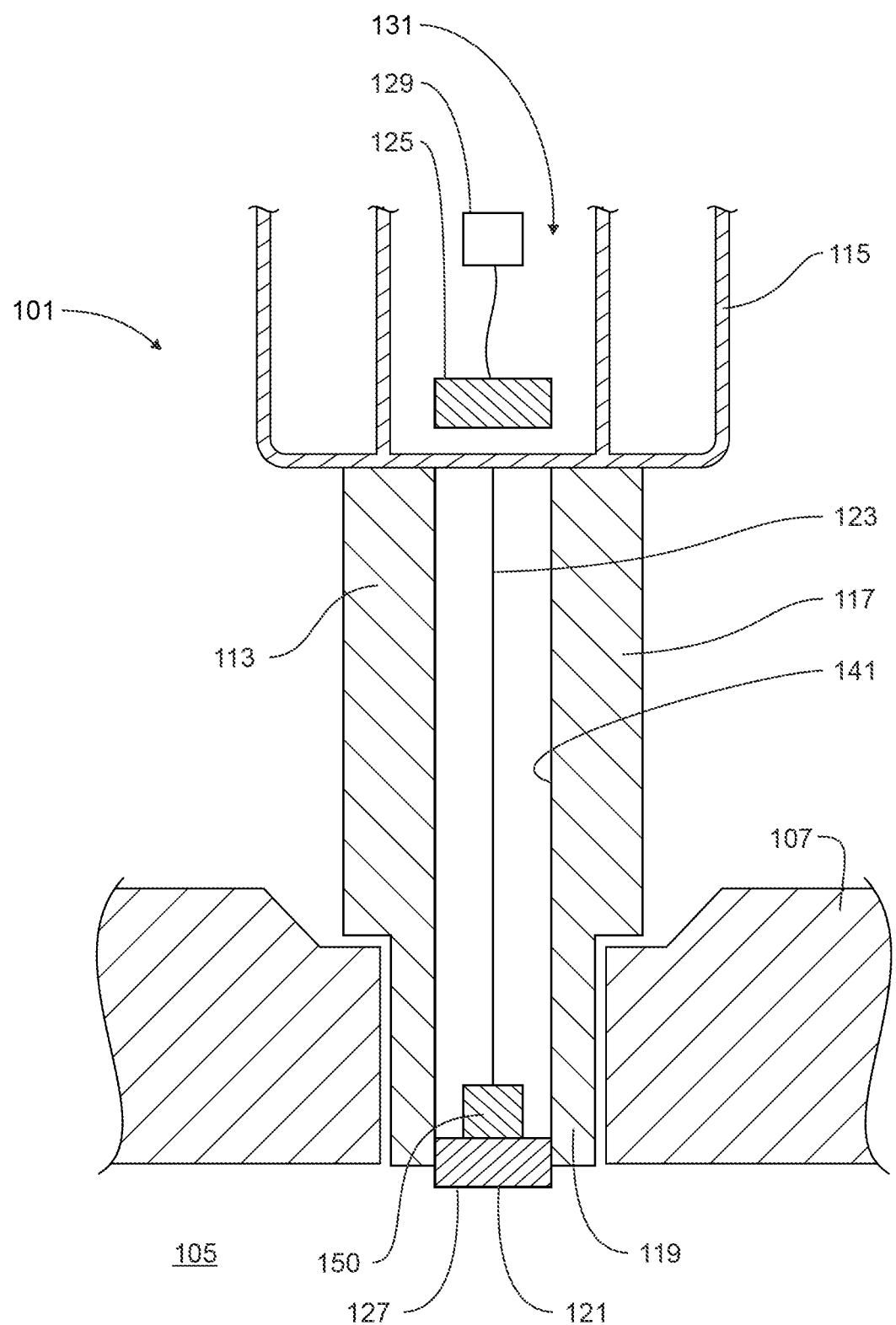
FIG. 1 is a schematic cross-sectional side view of an injector configured in accordance with embodiments of the technology.

The present technology is generally related to motion or displacement modifiers including displacement amplifiers (e.g., spring displacement, hydraulic displacement, mechanical motion) and/or displacement dampeners in fuel injectors. Particular embodiments are directed to spring displacement amplifiers and/or dampeners (e.g., elastomeric and/or ferrofluid motion embodiments) for use in the direct injection of gaseous fuels into combustion chambers such as may be found in internal combustion engines of various combustion chamber sizes, compression ratios, and piston speeds. In some embodiments, a fluid injector includes a motion modifier (e.g., displacement amplifier and/or dampener) that comprises a piezoelectric actuator and a constant volume chamber. The constant volume chamber has dimensions that are variable by a first input dimension motion produced by the piezoelectric actuator wherein the first input dimension is less than a second output dimension of a valve linkage to open a flow control valve from a normally closed position to allow fluid injection. The fluid injector (e.g., a gaseous fuel injector) further includes a motion modifier (e.g., displacement amplifier and/or dampener) in operable connection with the actuator. The motion modifier (e.g., displacement amplifier and/or dampener) can have a plurality of pistons in communication with the constant volume chamber (e.g., reservoir), configured to variably adjust the dimensions of the volume by an input dimension (e.g., first input dimension) and a corresponding larger output dimension (e.g., second output dimension).

Specific details of several embodiments of the technology are described below with reference to FIGS. 1-15B. Other details describing well-known structures and systems often associated with motion modifiers, amplifiers, dampeners, fuel injection systems, and ignition systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional and/or different elements, or the technology may have other embodiments without one or more of the features shown and described below with reference to FIGS. 1-15B. The systems or methods can include one or more of any of the features, concepts and/or steps, in whole or in part as disclosed herein, and/or in any of the references incorporated by reference. For example, the system can include any exemplary techniques, systems, and/or devices relating to displacement amplifiers, dampeners and/or fuel injection systems as disclosed herein.

FIG. 1 is a schematic cross-sectional side view of an injector 101 configured in accordance with embodiments of the technology. The injector 101 is configured to inject fuel into a combustion chamber 105 and utilize a motion or displacement modifier (e.g., amplifier and/or dampener). The motion or displacement modifier can include a displacement amplifier (e.g., displacement spring amplifier 150) to increase the amount and/or the delivery pressure of gaseous fuel entering the combustion chamber and/or utilize a displacement dampener to decrease or stop the amount and/or the delivery pressure of gaseous fuel entering the combustion chamber. In further embodiments, the fuel may be liquid, a gaseous/liquid combination, a partial solid or slurry, or other material. The motion modifier (e.g., displacement spring amplifier 150 and/or dampener) is schematically illustrated in FIG. 1 and can be positioned at any location on the injector 101 and coupled to any of the features described in detail below. Moreover, in certain embodiments the motion modifier (e.g., displacement spring amplifier 150 and/or dampener) can be integral with one or more of the valve actuating components described in detail below. Furthermore, although several of the additional features of the illustrated injector 101 described below are shown schematically for purposes of illustration, several of these schematically-illustrated features are described in detail below with reference to various features of embodiments of the disclosure. Accordingly, the relative location, position, size, orientation, etc., of the schematically-illustrated components of the Figures are not intended to limit the present disclosure.

While the embodiments of the fuel injection systems and motion modifiers (e.g., displacement amplifiers, displacement dampeners) disclosed herein may refer particularly to and/or include one or more displacement amplifiers as illustrated in FIGS. 1-15B, any of the fuel injection systems and motion modifiers disclosed herein can replace or substitute a displacement amplifier with a displacement dampener and/or include one or more displacement dampeners or stoppers in combination with, integral, separate, and/or discrete from the displacement amplifiers. A fuel injection system can include a motion modifier (e.g., displacement amplifier and/or displacement dampener) having both amplifying and dampening features or capabilities and/or configured to both dampen and amplify (e.g., in different directions and/or cycles or strokes). Further, in some embodiments, the fuel injection systems and/or motion modifiers include only one or more displacement amplifiers or only one or more displacement dampeners. In other embodiments, the fuel injection systems and/or motion modifiers include one or more displacement amplifiers and one or more displacement dampeners. In some embodiments, at least one displacement amplifier is of the same type as the displacement dampener (e.g., both are spring displacement, mechanical motion, or hydraulic displacement motion modifiers). In some embodiments, at least one displacement amplifier is of a different type as the displacement dampener (e.g., one is a spring displacement motion modifier and one is a mechanical motion modifier).

Any of the motion modifiers (e.g., displacement amplifiers, displacement dampeners) can include one or more of any of the features or components in whole or in part of any of the displacement amplifiers disclosed herein. While the displacement amplifiers disclosed herein generally are configured to increase or amplify motion in a first direction, the displacement dampeners are generally configured to prevent, stop, decrease, truncate, and/or "dampen" motion in a second direction. The second direction can be parallel, parallel but opposite, transverse and/or oblique to the first direction. For example, a fuel injection system of any of the embodiments disclosed herein can include an integrated motion modifier (e.g., combination dampener and amplifier) or two motion modifiers (e.g., a displacement amplifier to amplify or increase motion in a first linear direction and a displacement dampener to dampen or prevent motion in a second direction transverse to the linear direction). In some embodiments, a motion modifier (e.g., displacement amplifier and/or displacement dampener) is configured to amplify motion during a first stroke or cycle (e.g., of the engine, piston, valve, combustion) and dampen or prevent motion in a second stroke or cycle.

In the embodiment, as illustrated in FIG. 1, the injector 101 includes a casing or body 113 having a middle portion 117 extending between a base portion 115 and a nozzle portion 119. The nozzle portion 119 extends at least partially through a port in an engine head 107 to position the nozzle portion 119 at the interface with the combustion chamber 105. The injector 101 further includes a fuel passage or channel 141 extending through the body 113 from the base portion 115 to the nozzle portion 119. The channel 141 is suitably configured to allow fuel to flow through the body 113. The channel 141 is also configured to allow other components, such as a valve operator assembly 131, an actuator 123, instrumentation components including optical pathways such as fiber optics, and/or energy source components of the injector 101 to pass through the body 113. According to additional features of the illustrated embodiment, the nozzle portion 119 can include one or more ignition features for generating an ignition event for combusting the fuel in the combustion chamber 105. For example, the injector 101 can include any of the ignition features disclosed in U.S. patent application Ser. No. 12/841, 170 entitled "INTEGRATED FUEL INJECTORS AND IGNITERS AND ASSOCIATED METHODS OF USE AND MANUFACTURE," filed Jul. 21, 2010, which is incorporated herein by reference in its entirety.

In certain embodiments, the actuator 123 can be a cable, stiffened cable, or rod that has a first end portion that is operatively coupled or coupled to a flow control device or valve 121 carried by the nozzle portion 119. The actuator 123 can be integral with the valve 121 or a separate component from the valve 121. In certain embodiments flow valve 121 is positioned proximate to the interface with the combustion chamber 105 (e.g., an outward opening poppet valve or a radial opening sleeve valve). In other embodiments flow valve 121 is positioned proximate to the combustion chamber 105 (e.g., an inward opening poppet valve or radial opening sleeve valve).

Although not shown in FIG. 1, in certain embodiments the injector 101 can include more than one flow valve, as well as one or more check valves positioned proximate to the combustion chamber 105, as well as at other locations on the body 113. For example, the injector 101 can include any of the valves and associated valve actuation assemblies as disclosed in the patent applications incorporated by the references above.

The position of the flow valve 121 can be controlled by the valve operator assembly 131. For example, the valve operator assembly 131 can include a plunger or driver 125 (e.g., movable component) that is operatively coupled to the actuator 123. The driver 125 can be a prime mover such as a piezoelectric, magnetostrictive, electromagnetic, electromechanical, pneumatic, or hydraulic force generator. The actuator 123 and/or driver 125 can further be coupled (e.g., in electrical communication) to a processor or controller 129. As explained further below with reference to various embodiments of the disclosure, the driver 125 and/or actuator 123 can respond to the controller 129. The controller 129 can be positioned on the injector 101 or remotely located away from the injector 101. The controller 129 and/or the driver 125 are configured to rapidly and precisely actuate the actuator 123 to inject fuel into the combustion chamber 105 by moving the flow valve 121 via the actuator 123.

For example, in certain embodiments, the flow valve 121 can move outwardly (e.g., toward the combustion chamber 105) and, in other embodiments, inwardly (e.g., away from the combustion chamber 105) to meter and control the injection of the fuel. In some embodiments, the driver 125 can apply a force (e.g., tension) to the actuator 123 to retain the flow valve 121 in a closed or seated position, and the driver 125 can reduce (e.g., relax or relieve) the tension in the actuator 123 to allow the flow valve 121 to inject fuel. In other embodiments, the flow valve 121 may be opened and closed depending on the pressure of the fuel in the body 113 without the use of an actuator (e.g., cable or rod). Additionally, although only a single flow valve 121 is shown at the interface of the combustion chamber 105, in other embodiments the flow valve 121 can be positioned at other locations on the injector 101 and can be actuated in combination with one or more other flow valves or check valves.

The injector 101 can further include one or more sensors and/or transmitting components 127 for detecting and relaying information such as the degree of valve opening, fuel mixture ratios, and/or combustion chamber properties such as temperatures, pressure, piston position, fuel injection and/or combustion pattern etc., and providing feedback to the controller 129. The sensor 127 can be integral to the valve 121, the actuator 127, and/or the nozzle portion 119 or a separate component that is carried by any of these portions of the injector 101.

In some embodiments, the actuator 123 can be formed from fiber optic cables or insulated transducers integrated within a rod or cable, or can include other sensors to detect and communicate such valve position and combustion chamber data. Although not shown in FIG. 1, in other embodiments, the injector 101 can include other sensors or monitoring instrumentation located at various positions on the injector 101. For example, the body 113 can include optical fibers integrated into the material of the body 113. In addition, the flow valve 121 can be configured to sense or carry sensors to transmit combustion data or other types of data to one or more controllers 129 that are associated with the injector 101.

The combustion or other types of data can be transmitted via wireless, wired, optical or other transmission mediums to the controller 129 or other components (e.g., pathways through case or body 113 and/or filaments comprising a linkage). Such feedback enables extremely rapid and adaptive adjustments for desired fuel injection factors and characteristics including, for example, fuel delivery pressure, fuel injection initiation timing, fuel injection durations for production of multiple layered or stratified charges, combustion chamber pressure and/or temperature, the timing of one, multiple or continuous plasma ignitions or capacitive discharges, etc. For example, the sensor 127 can provide feedback to the controller 129 as to whether the measurable conditions within the combustion chamber 105, such as temperature or pressure, fall within ranges that have been predetermined to provide a desired combustion efficiency. Based on this feedback, the controller 129 in turn can direct the motion modifier (e.g., displacement spring amplifier 150) to manipulate the frequency and/or degree of travel of flow valve 121 (e.g., from a normally closed position).

The motion modifier (e.g., displacement spring amplifier 150) can take on numerous forms according to different embodiments of the disclosure and can transfer or modify (i.e., amplify, increase, alter) the motion of the driver 125, the actuator 123, the flow valve 121, and/or other components of the fuel injector 101. A spring displacement dampener can dampen, decrease, or prevent motion of the driver 125, the actuator 123, the flow valve 121, and/or other components of the fuel injector 101. In another embodiment, the motion modifier (e.g., displacement spring amplifier 150) transfers motion directly to the actuator 123 by any of the means described above. The actuator 123 in turn opens the flow valve 121 in a stroke responsive to the motion transfer, thereby altering the fuel distribution rate and/or pressure. In some embodiments, the motion modifier (e.g., displacement spring amplifier 150) transfers motion to the flow valve 121 directly (e.g., without a driver 125 and/or actuator 123).

Figure 2A:
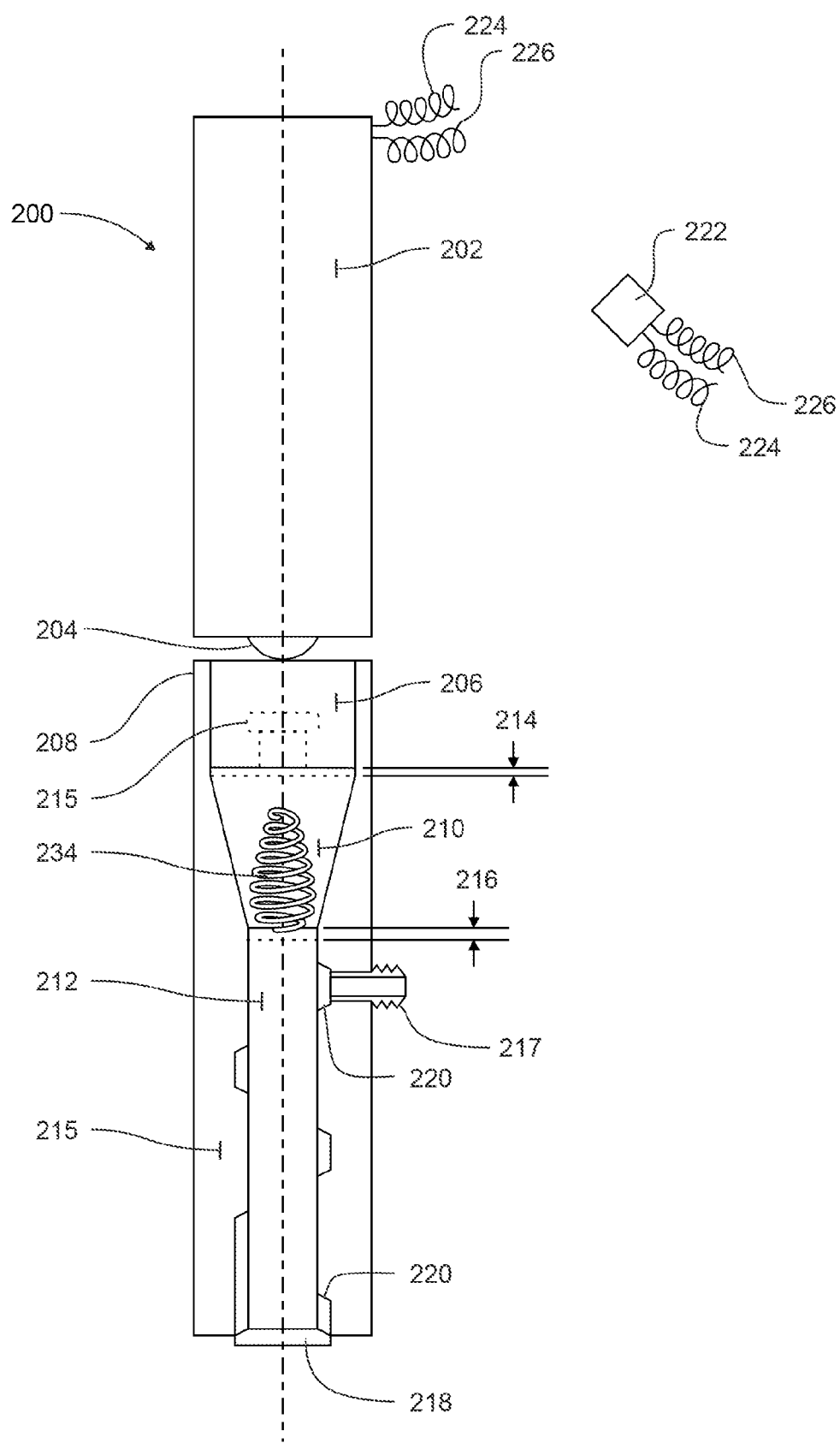
FIG. 2A is a cross-sectional side view of selected exemplary components of a displacement amplifier and/or dampener configured in accordance with embodiments of the technology.

FIG. 2A depicts a cross-sectional side view of selected features and portions of a motion or displacement modifier (e.g., displacement spring amplifier 200 and/or displacement spring dampener including elastomeric and/or ferrofluid motion features) configured in accordance with embodiments of the technology disclosed herein. Valve driver 202 (e.g., an electromagnetic solenoid, magnetostrictive, piezoelectric component) is contained in a fixed position canister (e.g., body, shell, tube, cylinder) and displaces a plunger 204 to produce an outward or inward thrust. In certain embodiments, the plunger 204 contacts a piston 206. In some embodiments, the piston 206 can have a partially spherical surface to provide a broader range of acceptable centerline misalignment. The piston 206 can thus be axially moved within a bore of case or housing 208 to displace a component 210 (e.g., elastomeric and/or ferrofluid filled body, member, structure, case, capsule, shell, component). The component 210 can be manufactured by various methods including casting to size in a mold or by compression or injection molding into a shape that is generally cylindrical on both ends of a truncated conical solid that comprises the central portion. Various compositions of elastomeric materials include composites of rubber-like selections (e.g., natural and manufactured rubber, urethane, fluoroelastomers, silicones, fluorosilicones). In some embodiments, selections of such materials include nano, micro and/or macro-sized capsules or closed cell inventories of selected liquids or gels such as multi-weight oils, silicone oils, vapors or gases such as carbon dioxide, nitrogen, helium, argon, or air. Variations can include permutations of such selections.

In the illustrative embodiment of FIG. 2A, plunger 204 is preloaded against piston 206 within the bore of case or housing 208. The opposite face of piston 206 is preloaded against the component 210 formed of a natural or artificial rubber (e.g., deformable substance or material) with suitable resistance to abrasion and compression set characteristics such as silicone, nitrile, ethylene-propylene (EPDM), fluorinated rubber compounds such as polytetrafluoroethylene (PTFE) blends or fluorinated silicone, or a polyether-elastomer. In further embodiments, the deformable substance is an elastomer, liquid, a gaseous/liquid combination, a partial solid or slurry, or other material including radiation cross-linked and oxygenated or halogenated preparations. Illustratively, fluorosilicones have excellent compression set resistance at temperatures between about −60° C. to 175° C. (−78° F. to 347° F.).

The component 210 (e.g., elastomeric and/or ferrofluid filled body, member, structure, case, capsule, shell, component) can react to loading or thrust that may be exerted (e.g., generated, supplied) by valve driver 202 through plunger 204 and piston 206. The component 210 can act as a virtually incompressible but readily deformable material that can serve (e.g., function) as a spring as it recovers to its originally molded shape upon relaxation of the strain produced (e.g., loading, thrust) and subsequent amplified displacement of valve stem 212 by the thrust. In many instances, the compression induced displacement 214 (e.g., strain) produced as a result of the loading or thrust of driver 202 may be quite small such as about 0.1 mm (100 microns or 0.004″), which can be substantively less than (e.g., far below) the elastic deformation limit of the component 210 such that a long fatigue endurance life is possible or indicated. Thus, the component 210 springs (e.g., returns) back (e.g., elastically) to the molded dimensions (e.g., originally molded, natural, unstrained, unstressed, resting shape) upon relaxation or removal of such thrust.

The component 210 (e.g., elastomeric and/or ferrofluid filled body, member, structure, case, capsule, shell, component) may be free from (e.g., unattached, uncoupled, disconnected) or it may be bonded or otherwise attached to piston 206. Similarly, the component 210 may be free from or it may be bonded or otherwise attached to pin or valve stem 212. Any suitable geometry (e.g., shape, configuration) of the component 210 including the interface between the piston 206, the component 210, and/or valve stem 212 may be presented including shaped recesses, seal lips, rounded edges, spring forms 234, etc. Various suitable methods for attaching molded component 210 to piston 206 and/or pin or valve stem 212 include interlocking features such as an inter-locking extension of or spring lock within valve stem 212 and/or piston 206. In certain embodiments, when the component 210 is attached to pin or valve stem 212 and/or to piston 206, a spring action is applied as the component 210 recovers (e.g., springs back, returns) to its originally molded dimensions and exerts a closing force on valve 218 against seat 220 upon relaxation of the force (e.g., loading, thrust) by plunger 204.

In some embodiments, in operation, the component 210 (e.g., elastomeric and/or ferrofluid filled body, member, structure, case, capsule, shell, component) is strained by displacement 214 by axial travel of piston 206 in a cylindrical portion of a larger cylinder bore (e.g., hole, tube, opening, aperture) in case 215. The component 210 serves as an incompressible component (e.g., fluid, material, spring body) to produce a larger axial travel (e.g., displacement 216) of a smaller diameter cylindrical pin or valve stem 212 within a smaller bore (e.g., hole, tube, opening, aperture) in partially shown case 208. The ratio of the larger area of piston 206 to the smaller face area of cylindrical pin or valve stem 212 determines a motion amplification (and/or motion dampening) factor (e.g., displacement amplification or dampening factor) or ratio for increasing (or decreasing) the stroke of valve 218. Such amplification enables a substantially or relatively small thrust or displacement 214 (e.g., strain) of plunger 204 and piston 206 such as 100 microns to be amplified as necessary or required (e.g., 1.5 to 10 times) to provide an increased gap or displacement 216 between valve seat 220 and normally closed valve 218.

In some embodiments, wherein the driver 202 includes a piezoelectric stack assembly, the displacement 214 (e.g., axial or linear strain or thrust) may be controlled according to the voltage applied through electrical connections 224, 226 upon actuation by controller 129 or 222. In instances that a piezoelectric stack assembly is utilized for driver 202, the rate of fluid flow (e.g., liquid and/or gaseous coolant and/or fuel) is thus controllable by the voltage applied to the piezoelectric stack assembly of driver 202. This can enable adaptive control of the driver voltage to vary the flow rate of fluids that are dispensed and to compensate for thermal expansion and/or differences in the thermal expansion of components in the assembly of displacement spring amplifier 200 and/or displacement spring dampener. The position of valve 218 from the valve seat 220 in case 215 (e.g., housing, shell, body) can be sensed by monitoring sensors in fiber optics 240 (e.g., filament bundle) and/or the capacitance of selected elements of the piezoelectric stack assembly of driver 202.

FIG. 2B shows another exemplary geometry and/or material composite for amplification (and/or dampening) of the displacement exerted by driver 202 through plunger 204 to piston 206. The component 210 (e.g., elastomeric and/or ferrofluid filled body, member, structure, case, capsule, shell, component) illustrated includes a composite of two or more materials and/or forms (e.g., exemplary shapes and materials of first and second portions 205, 207). Composite portions 205 and 207 may include any suitable subcomponent shapes and/or an overall shape such as the exemplary cylindrical shape illustrated in FIG. 2B. Portion 207 may have a different modulus of elasticity or Poisson ratio compared to (e.g., relative to) portion 205 to produce the desired amplification or dampening of displacement 216 of valve 218 through valve stem 212 compared to (e.g., relative to) motion (e.g., displacement 214) by piston 206 as a result of the relatively incompressible response by the composite elastomer body (e.g., composite portions 205 and 207 of component 210). In certain embodiments, the Poisson ratio may be negative such as may be provided for subcomponent (e.g., portion 205) by a foam elastomer compared to a positive Poisson ratio for subcomponent (e.g., portion 207) or vice versa. In other instances, the Poisson ratio, dampening characteristics, and/or the thermal expansion characteristics are customized by elastomer-filler composites. Examples include elastomers such as urethane or silicone rubber compositions modified by nano, micro, or macro capsules containing gas, liquid, vapor or gel and/or containing such substances by closed cell foam production.

Figure 3:
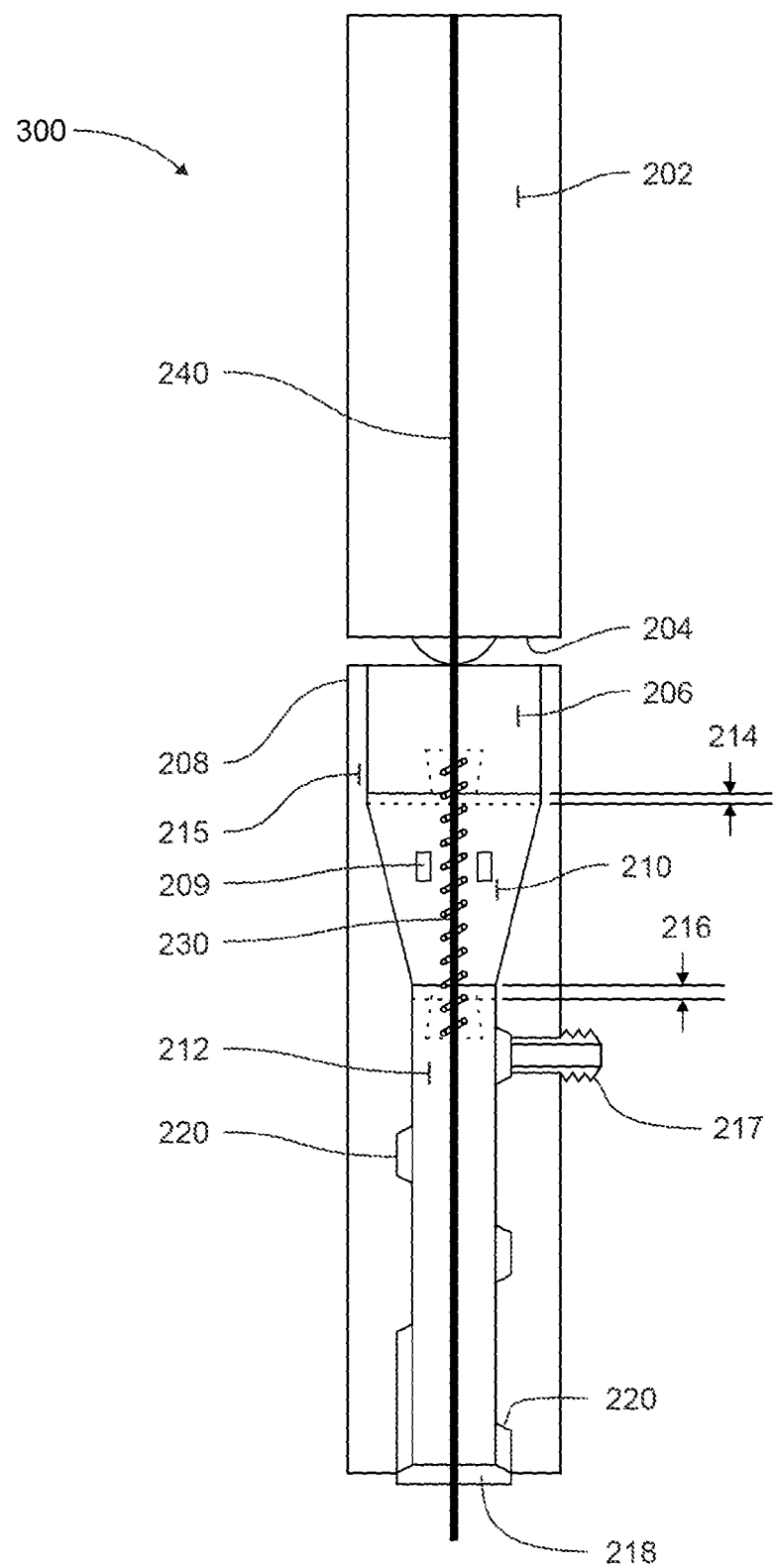
FIG. 3 is a cross-sectional side view of selected exemplary components of a displacement amplifier and/or dampener configured in accordance with embodiments of the technology.

In some embodiments elastic recovery of the original molded dimensions of the component 210 (e.g., elastomeric and/or ferrofluid filled body, member, structure, case, capsule, shell, component) and/or closing force on valve 218 may be provided and/or increased by one or more suitable springs 230 as illustrated in FIG. 3. Motion modifier (e.g., displacement amplifier 300) includes a spring 230 (e.g., tension, compression, coil, leaf) that is molded or positioned in the body of the component 210. One end of spring 230 is molded or positioned into an attachment cavity in piston 206 and/or at the opposite end into an attachment cavity in valve stem 212. Illustratively, spring 230 and/or component 210 may be a tension spring that is attached at both ends to provide a supplemental force to overcome the strain produced by thrust exerted by driver 202 through piston 206 and/or to supplement the closing force on valve 218 against valve seat 220. In some embodiments a communications bundle (e.g., fiber optics 240 is provided through a passageway extending through driver 202, plunger 204, piston 206, component 210, and/or valve 218 along with other components that may be assembled, to monitor and control valve position, fuel injection and combustion patterns, piston position, and/or other combustion chamber events.

In certain embodiments, the component 210 includes an elastomeric material and/or a suitable filler. In some embodiments, the component 210 includes a suitable filler but does not include an elastomeric material. In some embodiments, the component 210 comprises a composite assembly of a suitable filler liquid, gel, grease, or thixotropic substance that is sealed within a deformable container capsule (e.g., shell, body, casing). Example filler substances include, but are not limited to, low viscosity silicone and mineral oils including multi-viscosity formulations, fluorosilicones and/or fluorocarbon liquids, gels or grease, and various ferrofluids. Suitable container capsule materials include polyethylene, polypropylene, fluorinated ethylene propylene (FEP), poly-tetrafluoroethylene (PTFE), and various other engineering polymers. Illustratively, FEP film is a transparent, thermoplastic film that can be heat sealed, thermoformed, laminated, welded, and/or metalized. The FEP thickness for such fluid containment capsules can range from 0.013 mm (0.0005") to 0.38 mm (0.015") or thicker depending upon the application service requirements (e.g., size of engine). FEP capsules are strong, very tough and flexible at temperatures from about −79 to 200° C. (−110 to 390° F.).

In certain embodiments, magnetic attraction of valve stem 212 towards piston 206 may be utilized with or without mechanical springs (e.g., compression, tension, coil, leaf) to provide normally closed positioning of valve stem 212 and/or valve 218. For example, this can be provided by the magnetization of piston 206 and/or integration of a permanent magnet 219 into piston 206 and utilization of another magnet or ferromagnetic material for at least the proximate region of valve stem 212 (e.g., valve stem cap) as illustrated in FIG. 2C. Thus, in some embodiments, magnet 219 provides magnetic attraction of valve stem 212 and/or valve 218 to the normally closed position as piston 206 returns to the normally closed position.

FIG. 2D illustrates utilization of an elastomeric composition under compression by plunger 204 and piston 206 to displace one or more selections of elastomeric substances 221 and 223 (e.g., in any combination of suitable configurations) to thus displace one or more shaft(s) (e.g., valve stem 212) in any suitable direction including the off-set uni-directional alignment shown.

In certain embodiments, wherein one or more ferrofluids are utilized or included, pistons 206 or 406 and valve stems 212 or 412 may comprise relatively closely-spaced magnets that have any suitable arrangement of magnetic poles. As an example, magnetic poles of piston 206 and valve stem 212 may be opposite for purposes of attracting each other and/or for orienting the ferrofluid particles. Conversely, magnetic poles of piston 206 and valve stem 212 may be the same to produce opposing force and/or to orient the ferrofluid particles. In some embodiments, piston 206 is spaced relatively closely to a face of valve stem 212 in any suitable geometry including, but not limited to, complementary conical, flat and other surfaces to increase the attractive force exerted between opposite magnetic poles or the repulsive force exerted between like poles.

Figure 4:
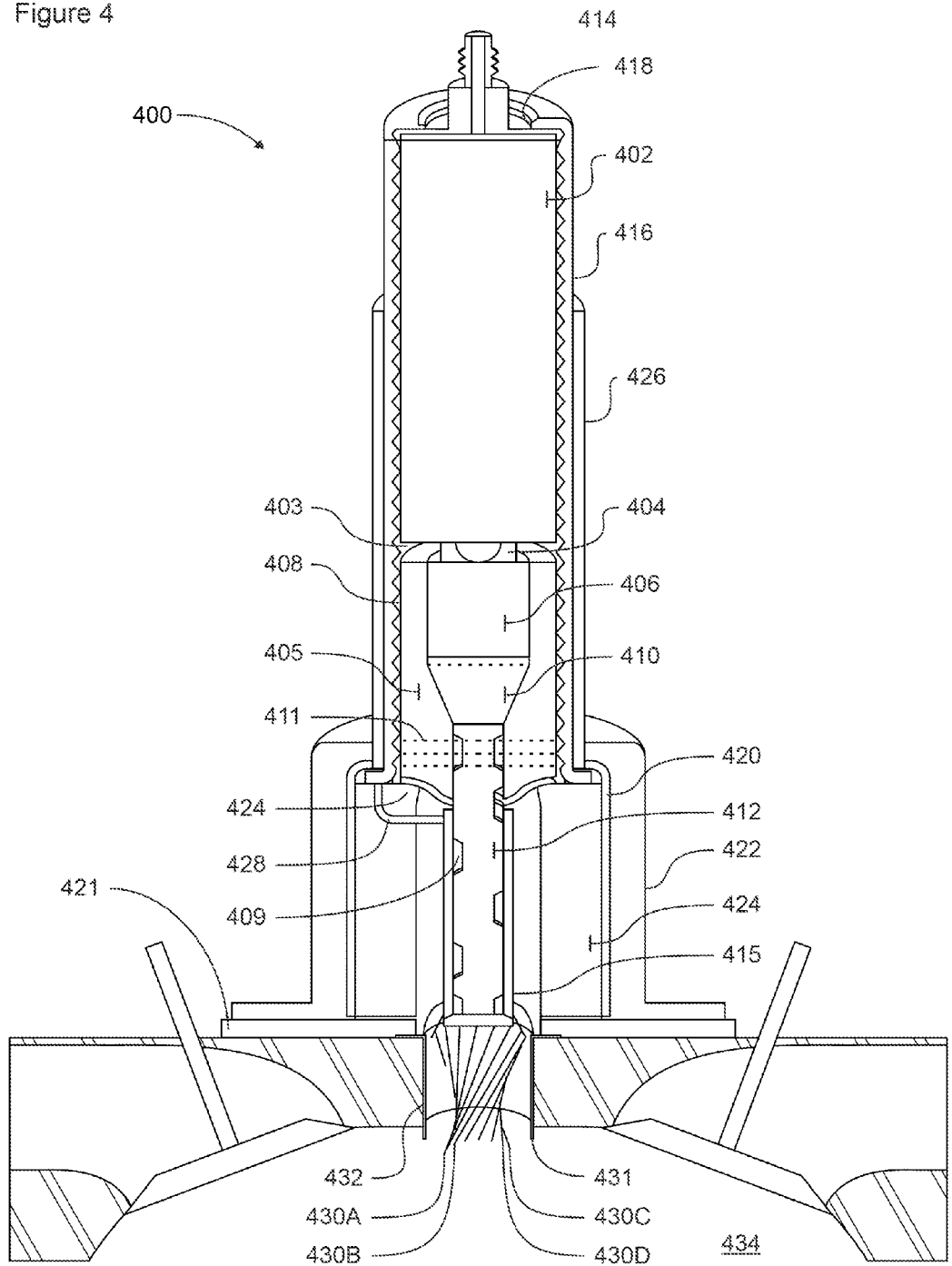
FIG. 4 is a cross-sectional side view of an assembly of selected exemplary components of a displacement amplifier and/or dampener configured in accordance with embodiments of the technology.

In the embodiment illustrated in FIG. 4, fuel injection and displacement amplifier 400 (e.g., elastomeric, ferrofluid) and/or dampening includes an arrangement for a driver 402 that produces a relatively small displacement (e.g., a solenoid or piezoelectric stack assembly) configured to be sealed and retained by brazing, laser welding and/or swage formed features 418 and 420 against a fluid fitting 414 by a case 416 (e.g., a bellows or other suitable form).

In certain embodiments, case 416 provides containment and one or more flow pathways for pressurized fluids admitted through fluid fitting 414 including passage through radial passageways or grooves to an outside diameter of driver 402, a spacer washer in space 403, and a dielectric body 405. The dielectric body includes passageways 411 to passageways such as helical grooves 409 to a valve seat in conductor tube 415. This provides stabilization of the temperature of components that are subject to heat transfer from the fluid admitted through fluid fitting 414. Illustratively, the temperature of the supply of fluid such as a fuel storage tank or pipeline at ambient temperature along with the extended heat transfer areas provided, establishes a relatively stable temperature for operation of the displacement amplifier 400, displacement dampener, and/or fuel injection system compared to the wide variation in temperatures within the combustion chamber 434.

Components of displacement amplifier 400 (and/or dampener) may be further designed to minimize the impact of thermal expansion through the range of operating temperatures and include materials such as listed in Tables 1 and 2. Illustratively, axial dimensions and the centerline for operation of piston 406 and valve 412 by dielectric body 405 may be maintained by a low coefficient of thermal expansion (CTE) material (e.g., fused quartz, Pyrex, Zerodur, Cervit, or glass ceramic compositions) to match or substantially match the expansion of piston 406 and/or valve 412 and/or conductor tube 415 which may be made of alloys such as Invar 36 or Invar 42. Similarly, insulator gasket 421 may be made of low thermal expansion material such as a mica composition or glass ceramic.

In certain embodiments, the thrust exerted by plunger 404 (e.g., a minimal heat transfer spherical contact) of driver 402 is amplified by compressive loading through a deformable substance filled capsule body 410 (e.g., according to the ratio of the face area of piston 406 to the face area of the opposing stem of valve 412). The deformable substance contained in the capsule may be an elastomer, gel, thixotropic solution, or a partial solid or slurry, Newtonian or Non-Newtonian fluid or other material including radiation cross linked and oxygenated or halogenated preparations.

Fluid flow is delivered to the valve seat of conductor tube 415 by annular helical passageways or grooves 409 around the stem of valve 412. Elevated voltage (e.g., 20 to 60 KV) for initiating spark, Lorentz ion current and/or subsequent corona discharge can be provided a suitable transformer (e.g., by in-line coil assembly 426 which is connected to conductor tube 415 by an insulated conductor 428). Conductor tube 415 may include features such as a bellows spring to further serve as a compression spring to urge valve 412 to the normally closed position. Coil assembly 426 may be segmented inductors that are excited by one or more alternator, magneto or battery driven circuits for generating Lorentz and/or corona discharges and may include one or more capacitors that are provided by ceramic-electrode layers of a piezoelectric stack of driver 402 and/or capacitors such as coaxial capacitors that are contained in dielectric bodies 405 or 424.

In some embodiments, spark and/or Lorentz ion current is developed between one or more electrodes 430A-430D (e.g., wire) and the engine ground provided by port 432 into the combustion chamber 434. Some embodiments utilize a counter electrode (e.g., a relatively thin walled liner 431) that is inserted into port 432 to provide certain functions such as serving as a lower work function surface for ion production, to reduce or overcome galvanic corrosion and/or as a replaceable wear component. Liner 431 may be a cylindrical sleeve or it may provide raised surfaces or strip electrodes such as one or more helical strips and may have ridges or any other suitable multifunction feature.

In certain embodiments the liner 431 is formed of relatively high work function alloy selections including material compositions listed in Table 2 that may be manufactured by any suitable technology including powder metallurgy to include porosity such as may be oriented toward the combustion chamber 434. The porosity filer substance is utilized to subsequently add materials (e.g., low work function materials) such as TiC, ZrC, along with cerium, lanthanum, neodymium, praseodymium or alloys of such rare earths with aluminum, magnesium, iron, and/or oxides of magnesium, iron and/or aluminum such as $Ce_nCa_{12}Al_7O_m$. In some embodiments alternate layers of material selections such as fine iron and/or magnesium particles are separated by thin layers that contain cerium or other rare earth powders to enable one layer at a time to produce hot spark grains that are launched into the combustion chamber.

In other embodiments, an electrical trigger current or spark is generated on or proximate to such pore filled materials to induce production of a small amount or spark grains of hot metal that is projected and/or swept into the combustion chamber 434 by the flow of oxidant and/or fuel from the space within and around electrodes 430A-430D. Oxidation of the hot metal spark may further increase the temperature and ability to initiate and/or accelerate combustion of fuel in the combustion chamber 434.

Similarly, preparations may be provided for numerous electrodes 430A-430X (e.g., wire electrode) such as in 430A-430D in which porosity is provided such as near the combustion chamber 434 for filling or refilling with hot metal spark production material. Such arrangements can provide for longer service life than ordinary spark plug electrodes because the number of electrodes 430A-430D and electrode lengths are much greater than the two very short wires of conventional spark plugs and because the current is thrust by Lorentz forces to spread the spark erosion over a much larger electrode area. In many applications electrodes 430A-430D and/or counter electrode (e.g., relatively thin-walled liner 431) are readily refurbished by cleaning and refilling the porosity filler composition.

In many applications conventional spark plug electrode life is 100,000 miles or more in combustion engines. Certain embodiments of the electrode assemblies of the present invention can provide considerably longer service life along with new capabilities for ignition by hot spark grains that are projected into homogeneous, striated or otherwise stratified fuel-oxidant patterns to accelerate ignition and/or completion of combustion. In various applications, an adaptive controller (e.g., controller 129) provides variation of the voltage and current magnitudes and durations for Lorentz thrust fuel ion currents during transient acceleration or full power to include production of hot spark grains compared to operation with Lorentz thrust oxidant ions and/or fuel ions at idle and cruise without production of hot spark grains.

In certain embodiments selected electrodes 430A-430D (e.g., wire) are formed to provide a minimum gap near port 432 and include fail-safe features that would prevent valve 412 from excessive travel such as into combustion chamber 434. In some instances electrodes 430A-D are formed as an effective cage by relative rotation of parallel electrodes with respect to conductor tube 415 to provide a suitable configuration such as a hyperboloid of revolution configuration for launching Lorentz thrust ion currents and/or subsequent corona induced acceleration and/or ignition of combustant reactions in the injected pattern of activated oxidant and/or fuel.

Figure 5A:
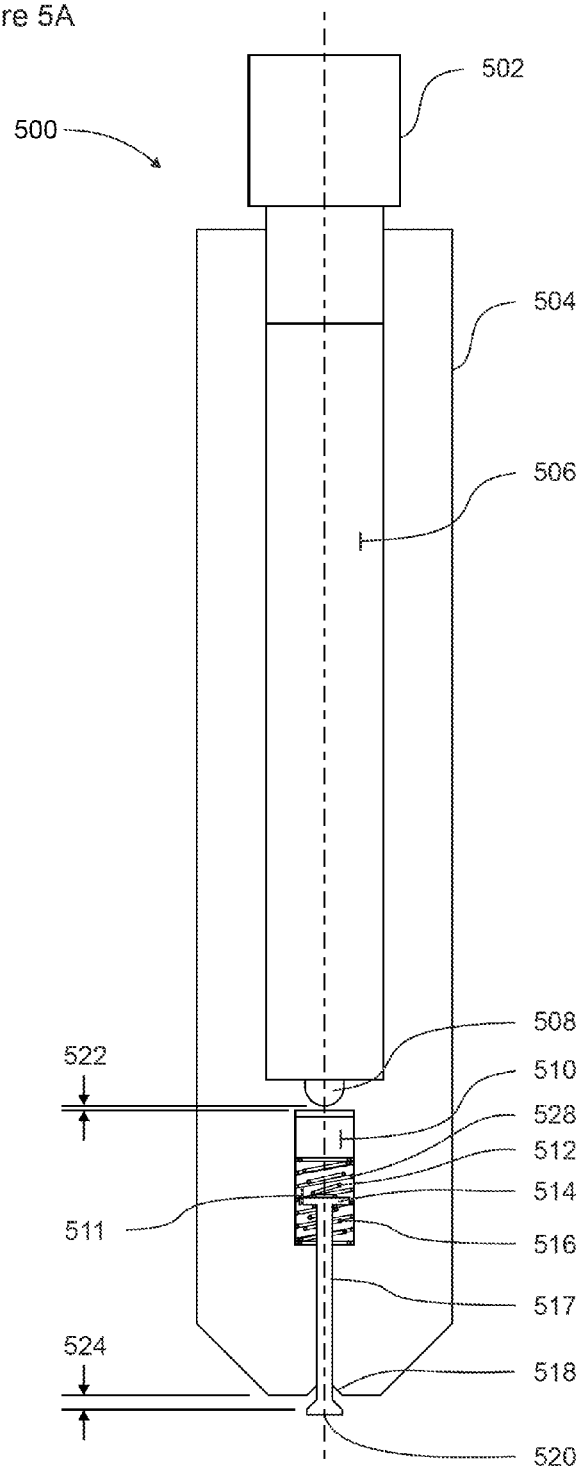
FIG. 5A is a cross-sectional side view of an assembly of selected exemplary components of a displacement amplifier and/or dampener configured in accordance with embodiments of the technology.
Figure 5B:
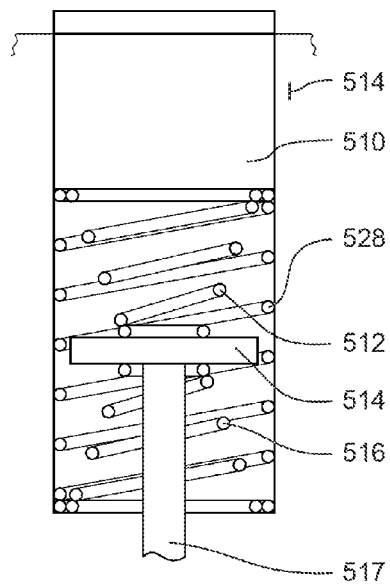
FIGS. 5B-5C are magnified views of portions of the fuel injector assembly of FIG. 5A configured in accordance with embodiments of the technology.
Figure 5C:
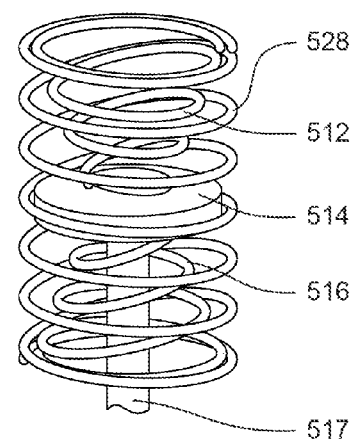

FIGS. 5A-5C show selected component representations in a fuel injection and motion modifier (e.g., displacement amplifier system 500) for amplification of a relatively small driver motion (e.g., variable piezoelectric input motion, extension or displacement 522) to typically produce a larger motion 524 (e.g., displacement) of valve 520 away from valve seat 518 to control fluid flow. Threaded cap 502 controls the compressive preload on piezoelectric driver stack assembly 506 within suitable spring case or body 504. Plunger 508 exerts piezoelectric extension or displacement 522 on piston 510 which in turn displaces deformable substance body 511 and displaces valve 520. The displacement is governed according to the ratio of the cross-sectional area of piston 510 to the cross sectional area of valve stem 517. In certain embodiments, one or more suitable springs (e.g., as illustrated by conical and helical compression springs 512, 516, 528) exert force on piston 510 to return the plunger 508 and piezoelectric driver stack assembly 506 to the normally closed position.

In the embodiment shown in FIG. 5A, compression spring 516 rests against valve cap 514 to urge valve 520 to the normally closed position. Springs 512, 516 and 528 may be placed within a fluid or composited with a selected elastomer within substance body 511 and may be of any suitable material and type including various shapes and types of helical wire forms, leaf springs, gas springs contained within capsules, spring washers and wave springs along with slotted disk springs.

Suitable substances for substance body 511 include water, anti-freeze, mineral oil, silicone fluids, fluorocarbon greases, gels and various elastomers such as silicone or fluorosilicone, neoprene and urethane. Such substances may be sealed within one or more deformable capsules made of materials such as polyolefins, fluoropolymers or polyesters along with composites including reinforcing filaments and/or fibers. Table 1 compares the thermal expansion characteristics of selected materials including elastomers that have additives such as $ZrW_2O_8$ or $ZrV_2O_7$ and/or that have been prepared by cross linking for producing the desired rate of thermal expansion.

TABLE 1

Thermal Expansion Properties

| Material | Thermal Range | ×10−6 mm/° C. | $H_2$ Compatible |
|---|---|---|---|
| EPDM | 150° C | 160 | Yes |
| Teflon | −60 to 230° C. | 50 to 80 | Yes |
| Urethane | 100°-150° | 180 | Yes |
| NBR | 120° C | 230 | Yes |
| Silicone A | −60 to 100° C. | 2 to 2.5 | Yes |
| $ZrW_2O_8$ | −60 to 700° C. | −8.7 | CTE Filler |
| $ZrV_2O_7$ | −50 to 500° C. | −7.6 | CTE Filler |
| Invar | −60 to 400° C. | 0.6-1.2 | Yes |
| MP35N | −60 to 530° C. | 15 | Yes |
| Haynes 230 | −60 to 530° C. | 14.2 | Yes |
| Rhenium | −60 to 1000° C. | 6.5 | Yes |

Mixtures of materials with negative coefficient of thermal expansion with materials such as silicone or fluorosilicones provides a bulk expansion characteristic that is suitable for applications in a wide range of temperatures. This is shown in the exemplary silicone A preparation in which silicone is mixed with expansion modifiers such as $ZrW_2O_3$ and further modified by cross linking to suitably customize the resulting properties. In other instances or embodiments, it is practical to provide one or more bubbles (e.g., a capsule containing a gas, a closed cell foam containing multitudes of gas cells) for the purpose of serving as a gas spring that contracts in volume in response to forces produced by thermal expansion of the relatively incompressible elastomer. Illustratively, any suitable shape and form factor of closed cell foam such as a doughnut or gas filled capsule 209 that contracts in volume to nullify thermal expansion of surrounding elastomer may be utilized to provide an apparent low overall bulk rate of thermal expansion.

Alternatively, any fraction or portion of the entire substance body 511 (e.g., elastomeric) may comprise a foam that accommodates thermal expansion of the elastomer by reduction of the gas volume in closed cell bubbles. Such arrangements for composited embodiments include one or more layers or other forms of foam such as portions 205 and/or 207 that are forced to contract in volume to provide a suitable overall maintenance of the composite volume. This type of foam and/or bubble volume compensation arrangement may be utilized with or without other adjustments such as incorporation of negative coefficient of thermal expansion materials and/or cross linking of the elastomer constituents.

FIGS. 5D-5E illustrate an embodiment of system 550 in which spring 528 exerts force to return piston 510, plunger 508, and/or the piezoelectric drive stack assembly 506 to the normally closed position and spring 516 exerts force against valve cap 514 to return valve 520 to the normally closed position. In certain embodiments, spring 528 is utilized in conjunction with springs 512 and 516 to return piston 510, plunger 508, and/or valve 520 to the normally closed positions.

Certain embodiments utilize system 500 or 550 as fluid dispensers or injectors. In other embodiments, fluid injection and ignition functions are combined. sleeve 530 (e.g., ceramic) provides electrical and thermal insulation of a piezoelectric driver stack assembly 506 along with centerline guidance of components such as piston 510 and valve 520. Sleeve 532 (e.g., ceramic) insulates electrode wires such as 538A-538D, which may be formed in loops to produce a cage to prevent over extension of valve 520. One or more coaxial inductors or transformers 534 provides sufficiently high voltage between electrodes 538A-538D and 540 to produce spark and/or Lorentz thrust ions and/or subsequent corona discharge into combustion chamber 542. Electrode wires or loops 538A-538D present Lorentz ion launched patterns that stimulate corona discharges to accelerate the completion of combustion of fuel and activated oxidant and/or fuel ions and oxidant.

In some embodiments, one or more pressurized fluids such as compressed natural gas, hydrogen, carbon monoxide, wet or dry fuel alcohols, ethane, and/or propane are connected by fittings 544A or 544B for delivery along one or more helical passageways 546A and 546B positioned between sleeves 530 and electrode 540 to passageway 548 for injection into combustion chamber 542 when valve 520 is opened. Body 504 may be made of any suitable material including selected ceramics or metal alloys with low or no thermal expansion in the range of operating temperatures.

Illustratively, in some embodiments, case or body 504 may be made of Kovar, Dilver P, or Invar 36 or other face-centered cubic alloys to provide resistance to hydrogen embrittlement. Sleeve 530 may be made of borosilicate glass or fused quartz with matching or very low coefficient of thermal expansion. Similarly, valve 520 may be made of MP35 N Haynes 230, Kovar, Dilver P, or Invar 36 or other face-centered cubic alloys to provide resistance to hydrogen embrittlement. Intermittent fuel flow through passageways 546A and/or 546B provides cooling of component 540 and/or sleeve 530 to minimize, reduce, or eliminate dimensional variations due to thermal expansion or contraction of such components.

Electrode wires 538A-538D provide spark, Lorentz ion thrusting and/or subsequent positive or negative corona discharge in the combustion chamber 542. Suitable component materials include hydrogen compatible alloys such as noted in Table 2 and rhenium along with various other suitable alloys.

TABLE 2

Hydrogen Compatible Alloys

| ELEMENT | Ni SA | INVAR | HAYNES 230 | MP35N** |
|---|---|---|---|---|
| Nickel | Bal | 36 | 57 | 35 |
| Iron | | 24-34 | 64 | 3.0* | N.A. |

TABLE 2-continued

Hydrogen Compatible Alloys

| ELEMENT | Ni SA | INVAR | HAYNES 230 | MP35N** |
|---|---|---|---|---|
| Chromium | 17-19 | N.A. | 22 | 20 |
| Tungsten | 3.0-6.0 | N.A. | 14 | N.A. |
| Molybdenum | 3.0-5.0 | N.A. | 2.0 | 10 |
| Cobalt | 3.0-5.0 | N.A. | 5.0* | 35 |
| Vanadium | 0.1-1.0 | N.A. | N.A. | N.A. |
| Titanium | 2.0-3.5 | N.A. | N.A. | N.A. |
| Niobium | 0.5-2.0 | N.A. | N.A. | N.A. |
| Aluminum | 0.1-0.5 | N.A. | 0.3 | N.A. |
| Manganese | N.A. | N.A. | 0.5 | N.A. |
| Silicon | N.A. | N.A. | 0.4 | N.A. |
| Carbon | N.A. | N.A. | 0.1 | N.A. |
| Lanthanum | N.A. | N.A. | 0.02 | N.A. |
| Boron | N.A. | N.A. | 0.015* | N.A. |

*Max;
**Carpenter MP35N

Figures 15A, 15B:
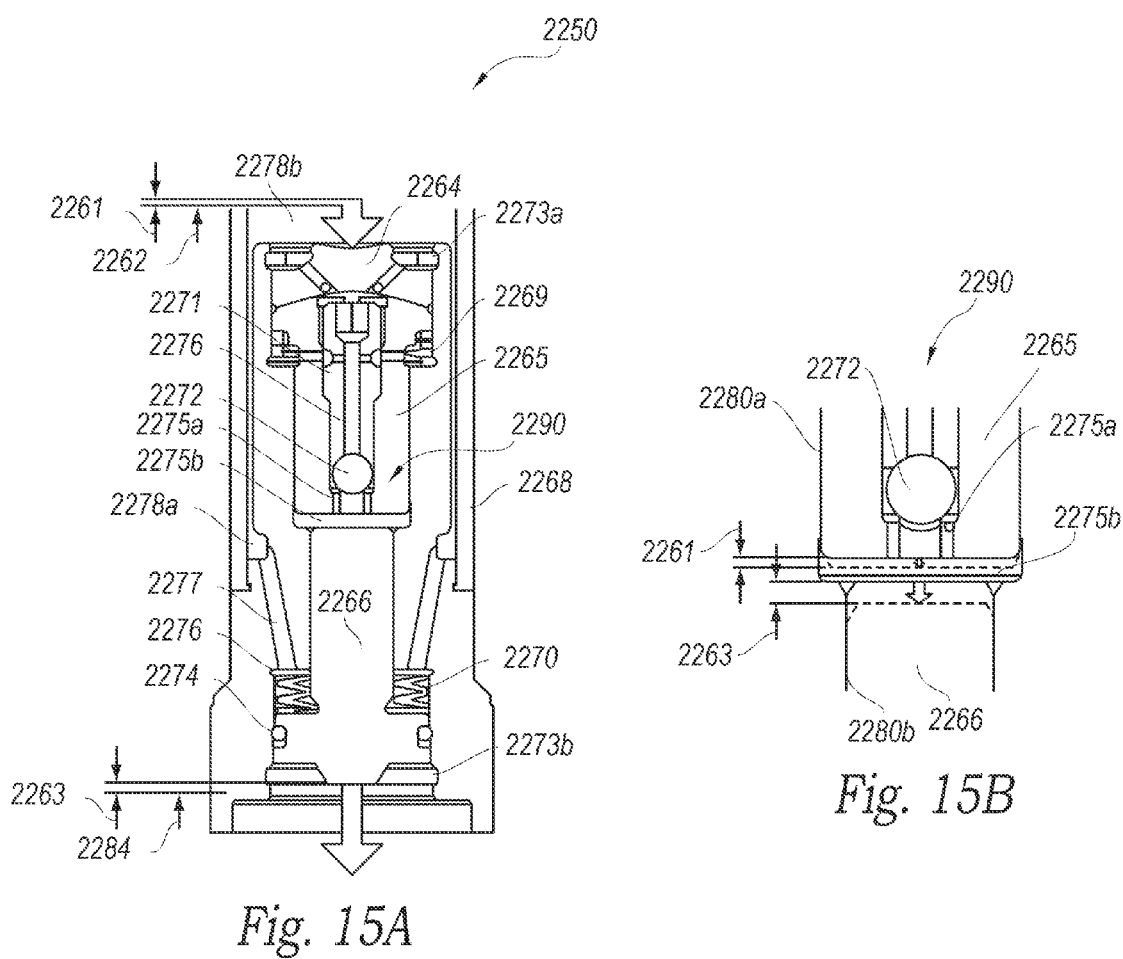
FIG. 15A is a cross-sectional side view of a hydraulic displacement amplifier and/or dampener configured in accordance with embodiments of the technology.
FIG. 15B is a magnified view of an amplification region of the hydraulic displacement amplifier and/or dampener of FIG. 15A in accordance with embodiments of the technology.

FIG. 15B is a magnified view of an motion modification region (e.g., amplification region 2290) of the motion modifier (e.g., displacement amplifier 2250) of FIG. 15A. Referring to FIGS. 15A and 15B together, the motion modifier (e.g., displacement amplifier 2250) can include an anvil 2264, an upper piston 2265, and a lower piston 2266 in communication with the upper piston 2265. The pistons 2265, 2266 can be movable to affect a first working volume 2275a and a second working volume 2275b (collectively, a "working volume 2275") in the motion modifier (e.g., displacement amplifier 2250). The working volume 2275 can communicate with reservoir volumes of fluid 2276, 2277, 2278a, 2278b (collectively, "reservoir volume") by means of a check valve 2272 and diametric leakage gaps 2280a, 2280b (collectively, "diametric gaps 2280") around the upper piston 2265 and lower piston 2266, respectively. In still further alternative embodiments, the diametric gaps 2280 can be eliminated, minimized, or reduced by adding active sealing, such as O-ring grooves, or vulcanized sealing systems. An orifice may then be included that precisely controls the flow rate into the appropriate reservoir volume from the working volume 2275. In further embodiments, the piston arrangement may be altered such that instead of unidirectional motion amplification and/or dampening, the motion is amplified and/or dampened and reversed. In some embodiments, an orifice can be controllably varied by a suitable component such as a piezoelectric element.

In various embodiments, the check valve 2272 can take on alternate forms, such as a ball valve, flapper valve, pintle valve, or spool type valve. Alternatively, the reservoir volume can be sealed by alternative means, such as with diaphragms, bellows, O-rings, or vulcanized sealing systems. In various embodiments, the filling of fluid into the device may be accomplished by means of vacuum filling, high temperature baking, vibratory shaking, or other viable means to achieve a fluid-filled device with minimized air volume allowed. In some embodiments, the motion modifier (e.g., displacement amplifier 2250) can be sub-assembled in a self-contained state by adding retaining rings 2273a, 2273b, and a shell 2268.

Figure 14:
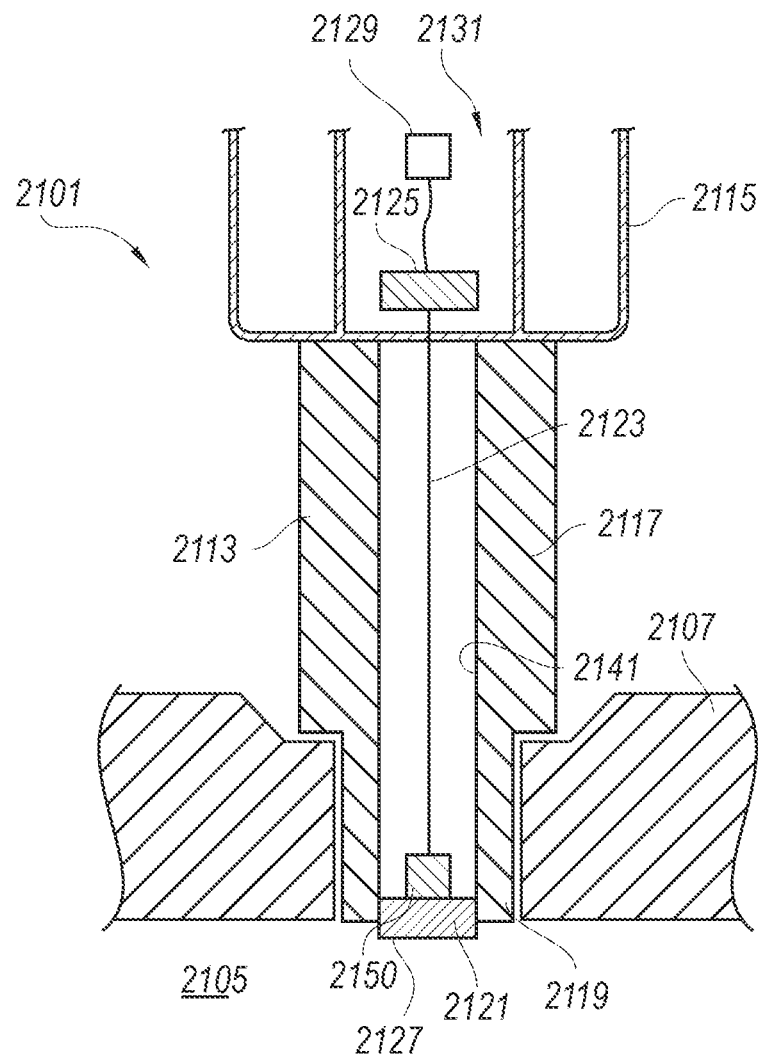
FIG. 14 is a schematic cross-sectional side view of an injector configured in accordance with embodiments of the technology.

In operation, the motion modifier (e.g., displacement amplifier 2250) can transfer, dampen, and/or amplify motion from a valve actuator (e.g., the actuator 123 shown in FIG. 14) to an injector valve (e.g., to a valve pin on the flow valve 2121 shown in FIG. 14). For efficient direct injection of gaseous fuels, a fast-acting actuator such as a piezoelectric multilayer motion generator may be used. The actuator can initiate an initial displacement 2261 that creates a displacement of the anvil 2264 and the upper piston 2265; the displacement momentarily reduces the working volume 2275, thus increasing the pressure within the working volume 2275. This pressure can increase until a static force 2284 from the injector valve pin is overcome. The pressure created will also exert an increased force 2262 back to the upper piston 2265 and thus the actuator (not shown). At this point, the lower piston 2266 is displaced by a distance 2263 and the working volume 2275 is restored.

The motion modifier (e.g., displacement amplifier 2250) can amplify and/or dampen motion between the valve actuator to the injector valve according to an amplification and/or dampening ratio. The amplification and/or dampening ratio R is, ideally, the ratio of the upper piston 2265 area $A_1$ divided by the lower piston 2266 area $A_2$, or $R=A_1/A_2$, where an area A is the cross-sectional area of each piston in this arrangement. The ideal ratio R, however, assumes that there is no fluid bulk modulus effects, volumetric influences, or leakages around the pistons 2265, 2266 or other leak points. The working volume 2275, fluid bulk modulus, piston diameters, and diametric 2 gaps 280 can be carefully chosen to achieve the desired amplification and/or dampening ratio.

The motion modifier (e.g., displacement amplifier 2250) can further serve to reduce operational constraints on the fuel injector. In various embodiments, the motion modifier (e.g., displacement amplifier 2250) can absorb effects due to thermal growth, thermal shrinkage, part geometry changes due to loads, gravitational effects, and other conditions that would limit the working parameters or actuator functionality of the injector. For example, in some embodiments both the upper piston 2265 and the lower piston 2266 are preloaded with a first spring 2269 and a second spring 2270, respectively, such that the working volume 2275 is maintained without the influence of gravity or other effects. Alternatively, the first and second springs 2269, 2270 may be helical compression springs, wave springs, Belleville washers, machined springs, urethane bushings, one or more magnets, or other suitable devices. In some embodiments, the displacement amplifier 250 further includes at least one of a magnet, pneumatic cylinder, or spring coupled to at least one of the plurality of pistons and configured to return the motion modifier (e.g., displacement amplifier 2250) to a starting position at the end of a displacement amplification and/or dampening cycle.

In further embodiments, thermal effects can be mitigated by the check valve 2272, which can permit one-way flow of fluid from the reservoir volume of fluid to the working volume 2275 when a pressure differential is created due to thermal effects, changes to geometry, or other effects and conditions that the injector valve system may experience in operation. When pressure is created in the working volume 2275, the pressure will exert a force on the check valve 2272 and force it against a valve seat 2271. This will cause leakage through the diametric gaps 280 around the pistons 2265, 2266 that will slowly reduce the pressure in the working volume 2275 to normal conditions. In some embodiments, the reservoir volume is sufficiently larger than the working volume 2275 in order to absorb leakage volumes of fluid from the working volume 2275. It can be appreciated that other means of containing reservoir volumes can be accomplished by means of diaphragms, O-ring seals 2274, bellows, etc. In certain applications, the fluid can be the same or a refined version of the liquid fuel that is suitable for the host engine. For example, in some embodiments, fluids such as diesel or jet fuel, gasoline, and/or various fuel alcohols can be used. In some embodiments, the reservoir volume can extend around the actuator (not shown) and provide a means of damping to the actuator assembly.

The motion modifier (e.g., displacement amplifier 2250) can offer several advantages over traditional systems. In some embodiments, the motion modifier (e.g., displacement amplifier 2250) can be used as part of an injector for a dedicated natural gas or gaseous fueling system for the automotive, heavy duty, or off road markets. For example, the ally-pressurized gas can reduce injection time. This can be useful for a diesel engine (compression ignition) type of application, where the direct injection of a gaseous fuel traditionally takes too long or the injector cannot deliver enough gaseous fuel due to the low density characteristics of gaseous fuels. In other cases, the fuel system need not be a dedicated natural gas system, as diesel fuel can be used as a supplement and catalyst for combustion. In some applications, diesel fuel, gasoline, or other liquid fuel serves as an expendable amplifier working fluid and leakage can be added to the injected fuel. In such instances, replenishing supplies of such fuel working fluids can be added cyclically or occasionally to one or more of the reservoirs as previously described and/or to larger versions of such reservoirs.

Because of the low density characteristics of gaseous fuel, traditional systems require a very large valve arrangement and/or a high injector valve lift to sufficiently inject the required quantity of fuel in the amount of time needed for compliant emissions, burn characteristics, heat release, and power needs. In the case of a multilayer piezoelectric stack assembly, the force exerted is very high and can overcome a larger valve sealing arrangement, but is limited on available displacement. The present technology overcomes the displacement limitations of a piezoelectric multilayer actuator by amplifying the motion to the valve arrangement such that the injector has the ability to inject the required quantity of fuel in the amount of time allowable.

U.S. Patent Application Ser. No. 13/843,197, entitled "MECHANICAL MOTION AMPLIFICATION FOR NEW THERMODYNAMIC CYCLES,", and filed on or before Mar. 15, 2013, and U.S. Patent Application Ser. No. 13/842,636, entitled "SYSTEMS AND METHODS FOR PROVIDING MOTION AMPLIFICATION AND COMPENSATION BY FLUID DISPLACEMENT,", and filed on or before Mar. 15, 2013, are incorporated by reference herein in their entireties.

Certain embodiments disclosed herein relate generally to mechanical motion modifiers (e.g., mechanical motion amplification and/or dampening for fuel injectors). In some embodiments, an injector for introducing gaseous or liquid fuel into a combustion chamber includes an injector body having a base portion configured to receive fuel into the body and a valve coupled to the body. The valve can be movable to an open position to introduce fuel into the combustion chamber. The injector further includes a valve operator assembly. The valve operator assembly can include a valve actuator coupled to the valve and movable between a first position and a second position, and a prime mover configured to generate an initial motion. The valve operator assembly can also include a mechanical stroke or motion modifier configured to alter at least one of a direction or magnitude of the initial motion and convey the altered motion to the valve actuator.

Specific details of several embodiments of the technology are described below with reference to FIGS. 6-13. Other details describing well-known structures and systems often associated with amplifiers, fuel injection systems, and ignition systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 6-13.

Figure 6:
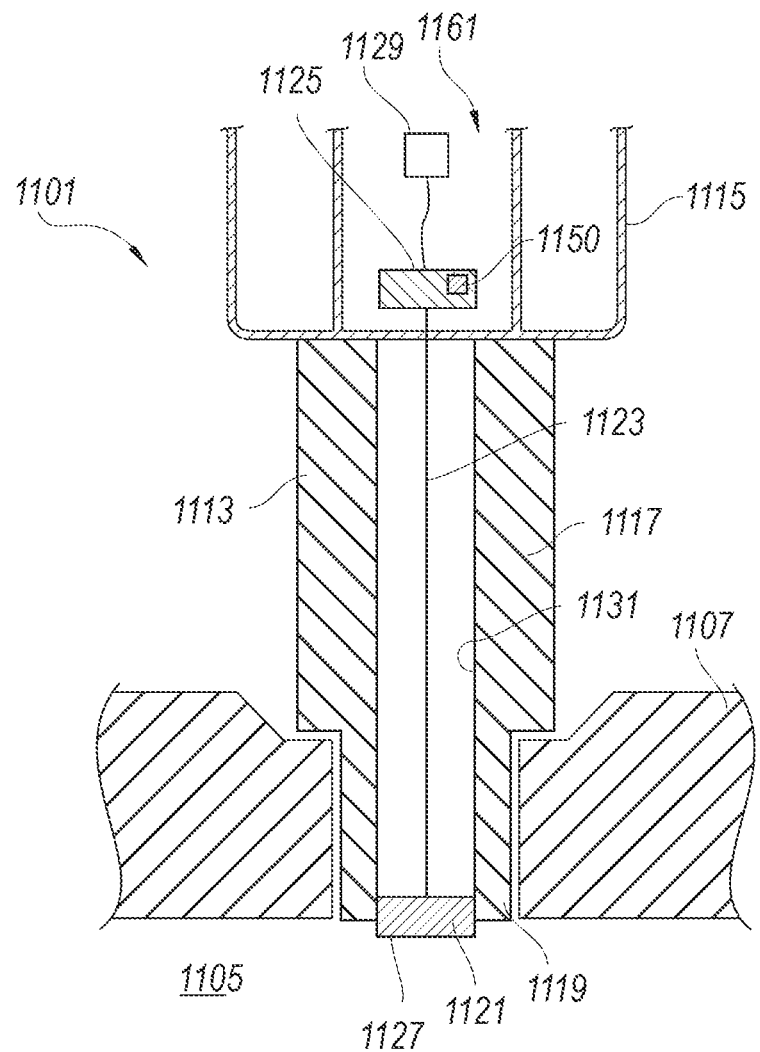
FIG. 6 is a schematic cross-sectional side view of an injector configured in accordance with an embodiment of the technology.

FIG. 6 is a schematic cross-sectional side view of an injector 1101 configured in accordance with an embodiment of the technology. The injector 1101 is configured to inject fuel into a combustion chamber 1105 and utilize a mechanical stroke modifier 1150 (e.g., amplifier and/or dampener) to transfer curvilinear or linear motion within the injector 1101. For example, the mechanical stroke modifier 1150 can transfer motion in order to provide an increased, decreased, or otherwise altered stroke of movement from a prime mover, such as a piezoelectric, magnetostrictive, electromagnetic, electromechanical, pneumatic, or hydraulic valve driver. The mechanical stroke modifier 1150 is schematically illustrated in FIG. 6 and can be positioned at any location on the injector 1101 and coupled to any of the features described in detail below. Moreover, in certain embodiments, the mechanical stroke modifier 1150 can be integral with one or more of the valve actuating components described in detail herein. Furthermore, although several of the additional features of the illustrated injector 1101 described below are shown schematically for purposes of illustration, several of these schematically illustrated features are described in detail below with reference to various features of embodiments of the disclosure. Accordingly, the relative location, position, size, orientation, etc. of the schematically illustrated components of the Figures are not intended to limit the present disclosure.

In the illustrated embodiment, the injector 1101 includes a casing or body 1113 having a middle portion 1117 extending between a base portion 1115 and a nozzle portion 1119. The nozzle portion 1119 extends at least partially through a port in an engine head 1107 to position the nozzle portion 1119 at the interface with the combustion chamber 1105. The injector 1101 further includes a fuel passage or channel 1131 extending through the body 1113 from the base portion 1115 to the nozzle portion 1119. The channel 1131 is configured to allow fuel to flow through the body 1113. The channel 1131 is also configured to allow other components, such as a valve operator assembly 1161, an actuator 1123, instrumentation components, and/or energy source components of the injector 1101 to pass through the body 1113. According to additional features of the illustrated embodiment, the nozzle portion 1119 can include one or more ignition features for generating an ignition event for igniting the fuel in the combustion chamber 1105. For example, the injector 1101 can include any of the ignition features disclosed in U.S. patent application Ser. No. 12/841,170 entitled "INTEGRATED FUEL INJECTORS AND IGNITERS AND ASSOCIATED METHODS OF USE AND MANUFACTURE," filed Jul. 21, 2010, which is incorporated herein by reference in its entirety.

In certain embodiments, the actuator 1123 can be a cable, stiffened cable, or rod that has a first end portion that is operatively coupled to a flow control device or valve 1121 carried by the nozzle portion 1119. The actuator 1123 can be integral with the valve 1121 or a separate component from the valve 1121. As such, the valve 1121 is positioned proximate to the interface with the combustion chamber 1105. Although not shown in FIG. 6, in certain embodiments the injector 1101 can include more than one flow valve, as well as one or more check valves positioned proximate to the combustion chamber 1105 and/or at other locations on the body 1113. For example, the injector 1101 can include any of the valves and associated valve actuation assemblies as disclosed in the patent applications incorporated by reference herein.

The position of the valve 1121 can be controlled by the valve operator assembly 1161. For example, the valve operator assembly 1161 can include a plunger or driver 1125 that is operatively coupled to the actuator 1123. The actuator 1123 and/or driver 1125 can further be coupled to a processor or controller 1129. As explained in detail below with reference to various embodiments of the disclosure, the driver 1125 and/or actuator 1123 can be responsive to the controller 1129. The controller 1129 can be positioned on the injector 1101 or remotely from the injector 1101. The controller 1129 and/or the driver 1125 are configured to rapidly and precisely actuate the actuator 1123 to inject fuel into the combustion chamber 1105 by moving the valve 1121 via the actuator 1123. For example, in certain embodiments, the valve 1121 can move outwardly (e.g., toward the combustion chamber 1105), and in other embodiments the valve 1121 can move inwardly (e.g., away from the combustion chamber 1105) to meter and control injection of the fuel. Moreover, the driver 1125 can tension the actuator 1123 to retain the valve 1121 in a closed or seated position, and the driver 1125 can relax or relieve the tension in the actuator 1123 to allow the valve 1121 to inject fuel, and vice versa. In other embodiments, the valve 1121 may be opened and closed depending on the pressure of the fuel in the body 1113, without the use of an actuator cable or rod. Additionally, although only a single valve 1121 is shown at the interface of the combustion chamber 1105, in other embodiments the valve 1121 can be positioned at other locations on the injector 1101 and can be actuated in combination with one or more other flow valves or check valves.

The injector 1101 can further include a transmitting component and/or sensor 1127 for detecting and relaying combustion chamber properties, such as temperatures and pressure, and providing feedback to the controller 1129. The sensor 1127 can be integral to the valve 1121, the actuator 1123, and/or the nozzle portion 1119 or a separate component that is carried by any of these portions of the injector 1101. In one embodiment, the actuator 1123 can be formed from fiber optic cables or insulated transducers integrated within a rod or cable, or it can include other sensors to detect and communicate combustion chamber data. Although not shown in FIG. 6, in other embodiments, the injector 1101 can include other sensors or monitoring instrumentation located at various positions on the injector 1101. For example, the body 1113 can include optical fibers integrated into the material of the body 1113. In addition, the valve 1121 can be configured to sense or carry sensors to transmit combustion data to one or more controllers 1129 associated with the injector 1101. This data can be transmitted via wireless, wired, optical, or other transmission mediums to the controller 1129 or other components. Such feedback enables extremely rapid and adaptive adjustments for desired fuel injection factors and characteristics including, for example, fuel delivery pressure, fuel injection initiation timing, fuel injection durations, combustion chamber pressure and/or temperature, the timing of one, multiple or continuous plasma ignitions or capacitive discharges, etc. For example, the sensor 1127 can provide feedback to the controller 1129 as to whether the measurable conditions within the combustion chamber 1105, such as temperature or pressure, fall within ranges that have been predetermined to provide desired combustion efficiency. Based on this feedback, the controller 1129 in turn can direct the mechanical stroke modifier 1150 to manipulate the frequency and/or degree of valve 1121 actuation.

The mechanical stroke modifier 1150 can take on numerous forms according to different embodiments of the disclosure, and can transfer or modify the direction and/or magnitude of motion of the driver 1125, the actuator 1123, the valve 1121, and/or other components of the fuel injector 1101. The motion transfer applied to any of these components can result in an increased, decreased, or otherwise altered stroke of valve actuation and associated altered conditions in the combustion chamber 1105. In one embodiment, the mechanical stroke modifier 1150 can be configured to achieve the desired quantity or pattern of the injected fuel bursts by transferring motion in the driver 125 to alter the degree to which the valve 1121 is opened.

In another embodiment, the mechanical stroke modifier 1150 transfers motion directly to the actuator 1123 by any of the means described above. The actuator 1123 in turn opens the valve 1121 in a stroke responsive to the motion transfer, thereby altering the fuel distribution quantity and/or pattern. In some embodiments, the mechanical stroke modifier 1150 transfers motion to the valve 1121 directly.

In another embodiment, that will be described in further detail with reference to FIGS. 6 and 7, the mechanical stroke modifier 1150 may be utilized to provide electrical and/or thermal barrier functions to the injector 1101. In some embodiments, the mechanical stroke modifier 1150 enables a prime mover that produces initial motion (e.g., the driver 1125) to operate at a much lower temperature than a driven member that moves a greater distance (e.g., the valve 1121). An application of this thermal barrier function is a system for dissociation of a hydrogen donor, such as a hydrocarbon.

The features of the injector 1101 described above with reference to FIG. 6 can be included in any of the embodiments described below with reference to FIGS. 7-13, above with reference to FIGS. 1-5, or in other embodiments of fuel injectors described in publications that have been incorporated by reference herein.

Figure 7:
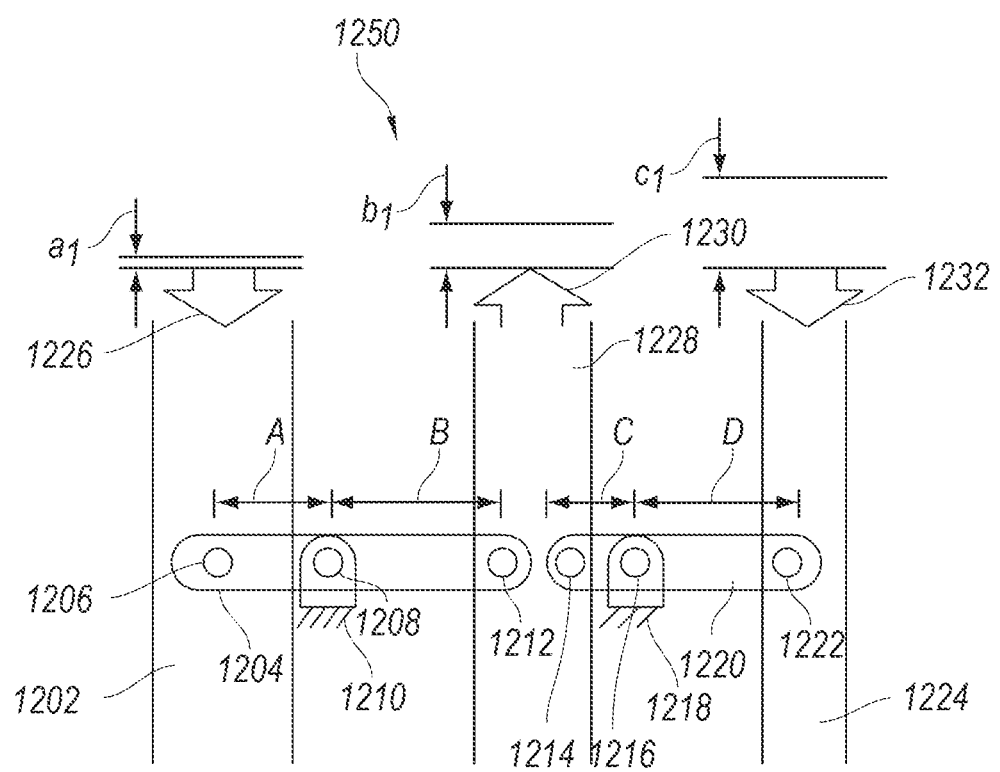
FIG. 7 is a partially schematic side view of a mechanical stroke modifier configured in accordance with embodiments of the technology.

FIG. 7 is a partially schematic illustration of a mechanical stroke modifier 1250 (e.g., amplifier and/or dampener) configured in accordance with embodiments of the technology. Some aspects of the mechanical stroke modifier 1250 are shown transparently to better illustrate certain aspects of the technology. The mechanical stroke modifier 1250 can transfer curvilinear or linear motion, such as motion having magnitude $a_1$, to a reduced, equal, or greater motion magnitude $b_1$. The motion magnitude $b_1$ may be further translated any number of times and is illustrated as translated to motion magnitude $c_1$. The motion transfer occurs by the action of one or more levers 1204, 1220. The mechanical stroke modifier 1250 includes a first rod or strut 1202 that is moved distance $a_1$ by initial force 1226 and produces motion $b_1$ by force 1230 transferred by a second strut 1228. In the embodiment shown, the motion magnitude $b_1$ is greater than the motion magnitude $a_1$ and is a function of the lever 1204 ratio of length B/A separated by fulcrum 1210. The motion magnitude $c_1$ is created by force 1232 imparted on a third strut 1224 and is greater than motion magnitude $b_1$. The motion magnitude $c_1$ is a function of the lever 1220 ratio of length D/C separated by fulcrum 1218.

In some embodiments, the initial force 1226 is created by a prime mover, such as a piezoelectric, magnetostrictive, electromagnetic, electromechanical, pneumatic, or hydraulic valve driver. Bearings 1206, 1208, and 1212 can be selected to enable low friction lever-action to provide axial motion in the second strut 1228 in the opposite direction of the first strut 1202; similarly, bearings 1214, 1216, and 1222 can provide for low friction lever-action to thrust the third strut 1224 in the same direction as the first strut 1202. Illustratively, overall amplification of motion at commensurately lower force may be developed by selections of the ratios B/A and D/C. Given the motion restraints (i.e. anti-friction bearings) and consequent freedoms allowed for the first and third struts 1202, 1224, the motion $c_1$ of the third strut 1224 is produced in the same direction as the motion $a_1$ and may be less, the same, or greater than the motion of the second strut 1228 depending upon the ratios B/A and D/C that are selected.

Figure 8A:
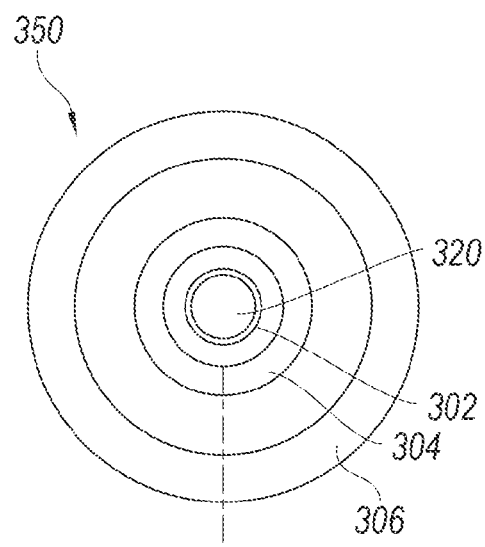
FIG. 8A is a top view of a mechanical stroke modifier configured in accordance with embodiments of the technology.
Figure 8B:
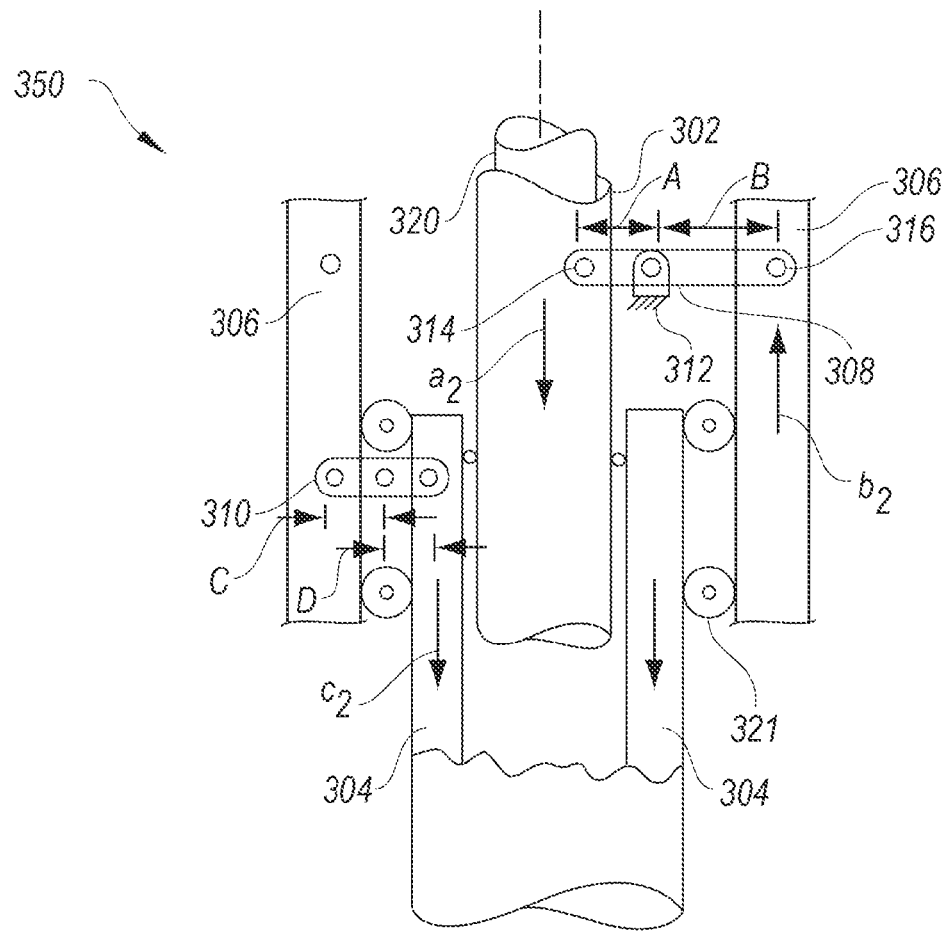
FIG. 8B is a side, partially-cutaway view of the mechanical stroke modifier of FIG. 8A.

FIG. 8A is a top view of a mechanical stroke modifier 350 (e.g., amplifier and/or dampener) configured in accordance with embodiments of the technology. FIG. 8B is a side, partially cutaway view of the mechanical stroke modifier 350 of FIG. 8A. Referring to FIGS. 8A and 8B together, the mechanical stroke modifier 350 includes first and second levers 308, 310 coupled to first, second, and third telescoping and/or coaxial plungers or tubes 302, 304, and 306 for transmitting force and motion. The first lever 308 is coupled to first and third tubes 302 and 306 at bearings 314, 316 and pivots on a first fulcrum 312. The first lever 308 moves with displacement $a_2$ of the first tube 302, which translates to produce displacement $b_2$ in the third tube 306 according to the ratio of B/A. Similarly, the second lever 310 is coupled to the second and third tubes 304, 306 and displaces the second tube 304 by motion magnitude $c_2$ upon moving third tube 306 by motion magnitude $a_2$, according to the ratio D/C.

The mechanical stroke modifier 350 can be used to increase or decrease stroke. For example, in applications such as providing an increased stroke of piezoelectric, magnetostrictive, electromagnetic, electromechanical, pneumatic, or hydraulic valve operators in the fuel injector system described above with reference to FIG. 1, the motion magnitude $a_1$ translated with lever ratios B/A and D/C exceed unity to increase or substantially increase the stroke. In other applications, such as manual or foot operated brakes or clutches, initial motion $c_1$ produces a relatively smaller motion $a_1$ at a greater or substantially greater force.

In certain applications it can be advantageous to mount an appropriately anchored, connected, and/or preloaded prime mover 320 (e.g., a piezoelectric, magnetostrictive, electromagnetic, electromechanical, pneumatic, or hydraulic force generating device or driver) largely or entirely within the first tube 302 to protect the prime mover 320 (and associated wiring and cables) and to provide an assembly with sufficient section modulus to prevent column deflection or buckling. The prime mover 320 can thus greatly improve the fatigue endurance of the mechanical stroke modifier 350.

Depending upon the sizes of assembly components and application characteristics, various friction reduction techniques or materials may be included. Various components of the mechanical stroke modifier 350 (e.g., levers or tubes), can be made of various materials such as lightweight ceramics, silicon nitride, and/or aluminum or titanium alloys. In some embodiments, these components can be anodized and/or coated with films such as aluminum-magnesium-boride ($AlMgB_{14}$), diamond-like carbon, molybdenum sulfide, PTFE, or other selections. This enables particularly lightweight compact assemblies that provide electrical insulation with high stiffness and side-load capabilities along with very high linear amplification and extremely rapid push-pull and performance capabilities.

The mechanical stroke modifier 350 can include numerous variations to tailor the device to a particular application. For example, in certain applications with high ratios for motion amplification or dampening (e.g., displacement amplification or dampening factor or ratio), captive nano, micro, or macro ball bearings 321 may be incorporated to reduce friction and/or to increase the diameter of the third tube 306 to further improve the section modulus and stiffness of an assembly of two or more lever tube struts. In further embodiments, it may be desirable to provide two, three, or more equally-spaced levers, such as the first lever 308, and to operate the bearings 314 and 316 within arced slots to minimize backlash and to balance reaction forces and side loads. Further, providing supports for the first fulcrum 312 can allow the mechanical stroke modifier 350 to be adaptable to a wide variety of applications including reversing the direction of thrust, increasing or decreasing the magnitude of motion, or increasing or decreasing the commensurate magnitude of force or thrust. In still further embodiments, one or more struts such as the first tube 302 may include a spring, magnet, or pneumatic cylinder to return the assembly to a starting position at the end of a force application cycle.

FIG. 9A is a side view of a mechanical stroke modifier 1450 (e.g., amplifier and/or dampener) configured in accordance with embodiments of the technology. FIG. 9B is an end view of the mechanical stroke modifier 1450 of FIG. 9A. Referring to FIGS. 9A and 9B together, the mechanical stroke modifier 1450 includes gear racks $R_1$, $R_2$, and $R_3$ and pinions $P_1$, $P_2$, and $P_3$. The racks and pinions can be operably connected such that an initial force F can be applied to rack $R_1$ to cause pinion $P_1$ to rotate counterclockwise on shaft L and to cause larger diameter pinion $P_2$, which is coupled to the same shaft on line L, to rotate counterclockwise at the same angular velocity. In various embodiments, diameters of pinions $P_1$ and $P_2$ may be equal or unequal. Therefore the ratio of $P_2/P_1$ may be unity, less than unity, or over unity as shown.

Pinion $P_3$ operates adjacent, below, or beside pinion $P_2$ against rack $R_2$ to displace another suitably engaged rack $R_3$ in any vector of desired thrust, such as parallel to the vector of initial force F (as shown) or along another vector as determined by boundary restraints or bearings that guide the racks $R_1$, $R_2$, and $R_3$. Pinion $P_3$ may be equal, smaller than either pinion $P_1$ or $P_2$, or larger than $P_2$ as shown.

In some embodiments of operation, such as amplifying the motion of a piezoelectric, magnetostrictive, electromagnetic, electromechanical, pneumatic, or hydraulic valve operator that exerts force F to move rack $R_1$ through distance $a_3$, the mechanical stroke modifier 1450 causes rack $R_2$ to move a larger distance $b_3$ which rotates pinion $P_3$ to move rack $R_3$ a much larger desired displacement $c_3$. Depending upon the desired geometrical characteristics of the transmission assembly, gear racks $R_1$, $R_2$, and $R_3$ may be parallel as shown or each may be operated on slides or other types of suitable live bearings at various other orientations.

In further embodiments of operation, the forces and distances or operations enabled by pinions $P_1$, $P_2$, and $P_3$ along with arrangements for racks $R_1$, $R_2$, and/or $R_3$ can be at different directions and magnitudes as needed to produce a desired actuation and/or thrust. For example, rack $R_1$ could be some angle such as perpendicular to $R_2$ and, similarly, $R_3$ could be operated to produce thrust at another angle as needed.

FIG. 10A is a side view of a mechanical stroke modifier 1550 (e.g., amplifier and/or dampener) configured in accordance with embodiments of the technology. The mechanical stroke modifier 1550 includes components for assured traction and prevention of slippage, such as a pinion 1501, a gear 1503, and a rim gear 1505. The rim gear 505 has gear teeth on an inside circumference and an outside circumference. The gear teeth on the inside circumference of the rim gear 1505 interface with gear teeth on the gear 1503. Strut racks $S_1$ and $S_2$ can provide/transfer linear or curvilinear motions by meshing with the pinion 1501 and the rim gear 1505, respectively. In further embodiments, any number of additional strut racks can be positioned at various other suitable orientations and locations on the pinions and gears. In various embodiments, the struts $S_1$, $S_2$ are operated within boundaries such as rocker bearings to produce and/or accommodate curvilinear travel for application of initial force, for transmission of force, and/or for amplification or contraction of motion magnitude.

FIG. 10B is a partially schematic side view of the mechanical stroke modifier 1550 of FIG. 5A showing pitch diameters 1502, 1504, and 1506 and unidirectional motions $R_1$, $R_2$, and $R_3$ of the pinion 1501, gear 1503, and rim gear 1505, respectively. The motions $R_1$, and $R_3$ show the motions of struts $S_1$, $S_2$, respectively. FIG. 10C is a top view of the mechanical stroke modifier 1550 of FIG. 5B. In FIGS. 10B and 100, the gear teeth and struts are omitted for purposes of clarity.

Referring to FIGS. 10A-10C together, the pinion 1501 includes suitable gear teeth on the outside diameter 1502 that mesh with teeth on strut $S_1$ that is thrust distance $R_1$ by a prime mover, such as a piezoelectric, magnetostrictive, electromagnetic, electromechanical, pneumatic, or hydraulic motor-generator (not shown). Therefore, in one embodiment, the pinion 1501 provides torque to turn the larger integral or common shaft mounted gear 1503 with an outside pitch diameter 1504 to mesh with teeth on the inside diameter of the rim gear 1505 with an inside pitch diameter 1506 and outer pitch diameter 1508.

In operation, the assembly of the pinion 1501 and the gear 1503, with pitch diameters 1502 and 1504, respectively, can rotate on centerline $C_1$, and the rim gear 1505 rotates on centerline $C_2$, to provide amplification of linear motion $R_1$ to an increased linear strut motion $R_2$, which may further increase to linear strut motion $R_3$, depending upon the ratio of respective pitch diameters, including the outer pitch diameter 1508 of gear teeth on the outside circumference of the rim gear 1505 that meshes with strut $S_2$, operating through motion $R_3$, which is illustrated in FIG. 10B as a linear motion arrangement.

Depending upon the bearing mounts and geometrical arrangements for maintaining centerlines $C_1$ and $C_2$, and the bearings for their associated struts $S_1$ and $S_2$, respectively, directed motions $R_1$, $R_2$, and $R_3$ may be at any particular angle with respect to the initiating motion $R_1$ and/or may be or include curvilinear motions.

In various embodiments the mechanical stroke modifier 1550 technology can be applicable to signal generation, feedback and control systems, valve operators, flow directors, and fuel pumps. Other embodiments combine pneumatic or hydraulic intensifiers, motion amplifiers, and/or direction altering relays including actions with struts such as $S_1$ and $S_2$. Struts, pinions, and/or gears may be micro, miniature, macro, and/or combinations of micro, miniature, and macro dimensioned components.

FIGS. 11A and 11B are side and top views, respectively, of a mechanical stroke modifier 650 (e.g., amplifier and/or dampener) configured in accordance with embodiments of the technology. The mechanical stroke modifier 650 can have several features generally similar to the geared embodiments described above. For example, the mechanical stroke modifier 650 can include a pinion 602, a gear 604, an inner rim wheel 606, and an outer rim wheel 620. In further embodiments, one or more of these features comprises a gear, rotor wheel, rim wheel, lever, or other similar structure.

FIG. 11C is an illustration of vectors representing the direction and magnitude of motion within the mechanical stroke modifier 650 of FIG. 11A. More specifically, the vectors include an initial motion (e.g., identified by vector 610) corresponding to movement of the pinion 602 and subsequently transferred and/or transformed motions 612, 614 corresponding to the movement of the inner rim wheel 606 and outer rim wheel 620, respectively. In further embodiments, the mechanical stroke modifier 650 can include or cause any number of other motions at selected angles from vector 610 along vectors that are tangential to the major diameter or pitch diameter of the wheels 606 or 620 for a larger amplification ratio.

Referring to FIGS. 11A-11C together, bearings 608, 616, and 622 (e.g., assemblies) can provide friction reduction and maintenance of parallel centerlines for rotations of the outer rim wheel 620, inner rim wheel 606, gear 604, and pinion 602. The inner rim wheel 606 is offset from the pinion 602 centerline C of rotation by distance 617. The outer rim wheel 620 is offset from the pinion 602 centerline C of rotation by distance 618. This provides a low friction reduction or amplification of motions depending upon the choice of primary force application (i.e., the cause of motion 610 or 614) and the resulting response.

Illustratively, the inner rim wheel 606 can be a rim and web or spoke component with inside and/or outside gear teeth on pitch diameters shown or a segment of such a configuration to act as a limited rotation lever. Accordingly, the inner rim wheel 606 may be a gear or friction drive component that the gear 604 drives by engaged gear teeth or contact friction. The ratio of the pitch diameter of the gear 604 to the pinion 602 provides an initial motion amplification that may be further amplified by the ratio of the outer pitch diameter of the inner rim wheel 606 to the inner pitch diameter on the inner rim wheel 606 as shown. Additional amplification may be produced by one or more nested or superimposed rim gears of friction drive wheels or segments as depicted by the outer rim wheel 620. While this illustrates amplification by sets of superimposed rim gears or wheels, any number of other amplifications may be similarly achieved with pinion-gear diameter ratios and appropriate jack shaft transfers. Motions such as those denoted by vectors 610-614 may be expressed by suitable gear racks or by friction drive shafts. In many applications, such racks or shafts move in vectors that are maintained by additional bearings and supports including mutually supporting low friction bearing elements between parallel gear racks, friction drive shafts, or combinations of these features.

In an application for amplification of linear motion produced in response to a prime mover such as an electromagnetic solenoid, piezoelectric, magnetostrictive, electromagnetic, electromechanical, pneumatic, or hydraulic force generator, a relatively small initial motion 610 is amplified into successively larger motions such as vectors 612 and 614. Various spring selections (not shown) including clock, leaf, and helical coil types may be utilized to urge the assembly back to an initial position between applications of force by such prime movers.

The mechanical stroke modifier 650 can include features for minimizing or eliminating gear backlash. Such features can include friction drives and any of numerous gear engagement profiles and materials selected for such purpose. For example, the mechanical stroke modifier 650 can include spring-loaded split gears that assure constant pitch engagement. Thermal expansion/contraction of components such as prime movers and/or linkages may be compensated or minimized by appropriate selections of the coefficients of thermal expansion for material selections for selected components.

The mechanical stroke modifier 650 may also be utilized to provide electrical and/or thermal barrier functions to produce amplified motion in any suitable direction, including push or pull force along vectors (e.g., along vectors 610 or 614). In some embodiments, the mechanical stroke modifier 650 enables a prime mover that produces the initial motion 610 to operate at a much lower temperature than the driven member that moves a greater distance, such as motion 612 or 614. In an illustrative example, the prime mover producing initial motion 610 is a piezoelectric component that can provide push and/or pull force, as it is maintained within a much lower temperature range than a valve that controls fluids that may range in temperature from cryogenic to heated fluids (i.e. −421° F. to 2400° F.) as a result of motion 614 from the outer rim wheel 620.

An application of this thermal barrier function is a system for dissociation of a hydrogen donor, such as a hydrocarbon, as shown in Equation 1.

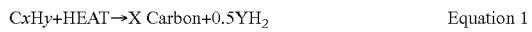

$$CxHy + HEAT \rightarrow X\ Carbon + 0.5YH_2 \quad \text{Equation 1}$$

This application allows inexpensive, off-peak utility power and/or surplus renewable energy sources (including regenerative recovery of energy) to utilize fossil and/or fresh biomass to produce carbon for manufacturing durable goods and to produce liquid fuels such as cryogenic hydrogen or liquid hydrogen storage compounds (including alcohols such as methanol, ethanol, propanol, or butanol) by reaction with carbon dioxide from the atmosphere or more concentrated sources such as a bakeries, breweries, ethanol plants, or power plants using fossil coal, oil, or natural gas. Equations 2 and 3 summarize selected illustrative productions of methanol and ethanol for utilization as liquid hydrogen carriers. Cryogenic liquid hydrogen and/or such ambient temperature liquid hydrogen carriers subsequently receive heat rejected from a heat engine or fuel cell to form gases at high pressure for direct injection into fuel cells and/or combustion engines.

$$3H_2 + CO_2 \rightarrow CH_3OH + H_2O \quad \text{Equation 2}$$

$$6H_2 + 2CO_2 \rightarrow C_2H_5OH + 3H_2O \quad \text{Equation 3}$$

This provides a new heat engine cycle that has a greater energy conversion efficiency limit than a fuel cell utilizes; such a liquid fuel used to supply hydrogen for stratified-charge internal combustion can be brought to a peak combustion temperature of 6,500° F. to 7,000° F. (6,960° R to 7,460° R) by preheating the fuel to about 1,000° F. Equations 4 and 5 compare the Carnot limit of this system with an ambient temperature, hydrogen-oxygen fuel cell as summarized by Equations 6 and 7. In some embodiments, such efficiency improvement achieved by preheating fuel as shown by Equation 5 starts with heating liquid hydrogen carriers such as alcohols or cryogenic hydrogen. For example, cryogenic hydrogen can be heated from −421° F. as it cools air in a turbocharger intercooler, and can then be further heated by counter current heat exchange with exhaust from a compound engine such as a turbocharger, and subsequently by exhaust from a primary engine and/or from regenerative heat produced by vehicle deceleration.

The heat engine efficiency shown in Equations 4 and 5 includes combustion of fuel and expansion through the two compounded engines from 6,960° R to 660° R, and regenerative preheating of the fuel to about 1,000° F. (1,460° R) for improving the overall potential energy conversion efficiency by changing the fuel from liquid to high pressure gas that is injected after top dead center to improve or substantially improve the thermodynamic cycle.

$$\text{Carnot efficiency limit } E = (T_H - T_L)/T_H \quad \text{Equation 4}$$

$$\text{Heat Engine Efficiency limit } E = (6960T_H - 660T_L)/6960T_H = 91\% \quad \text{Equation 5}$$

The same chemical reaction for hydrogen and oxygen in a fuel cell at ambient temperature is summarized by Equations 6 and 7 for the process of converting −237.2 kJ/mol of available energy (ΔG) from −285.8 (ΔH) total process energy.

$$H_2 + 0.5O_2 \rightarrow H_2O + \text{Electric Work} \quad \text{Equation 6}$$

$$\text{Fuel Cell Efficiency } E = -237.2kJ\Delta G/-285.8kJ\Delta H = 83\% \quad \text{Equation 7}$$

Pressurization of the hydrogen and oxygen delivered to a fuel cell can improve the operating efficiency, but much greater economic benefits may be provided by improvement of the vast population of existing heat engines. Further improvement in practical engine efficiency toward the Carnot limit of 91% can be achieved by endothermic dissociation and/or reaction of a suitable hydrogen carrier such as ammonia, methanol, ethanol, propanol, or butanol with an oxygen donor in an endothermic reaction to convert the reactants into products with higher combined chemical and pressure potential energy content. Equations 8 and 9 illustrate this general process for numerous alternative partial oxidation endothermic utilizations of heat transferred from engine or fuel cell coolant, engine exhaust gases, and/or heat produced by vehicle deceleration regeneration processes.

$$CH_3OH + HEAT \rightarrow 2H_2 + CO \quad \text{Equation 8}$$

$$C_2H_5OH + 2H_2O + 0.5O_2 \rightarrow 5H_2 + 2CO_2 \quad \text{Equation 9}$$

In some embodiments, suitable material selections for accomplishing the electrical and/or thermal barrier functions of the mechanical stroke modifier 650 can include sapphire balls and silicon carbide races for bearings 608, 616, and/or 622; silicon nitride, spinel, or partially stabilized zirconia for pinions, gears, or wheels 602, 604, 606, and/or 620; and similar ceramics or heat resisting stainless steel or super-alloy racks or struts that are displaced in vectors such as 610 and 614. In further embodiments, other materials can be used.

Figure 12A:
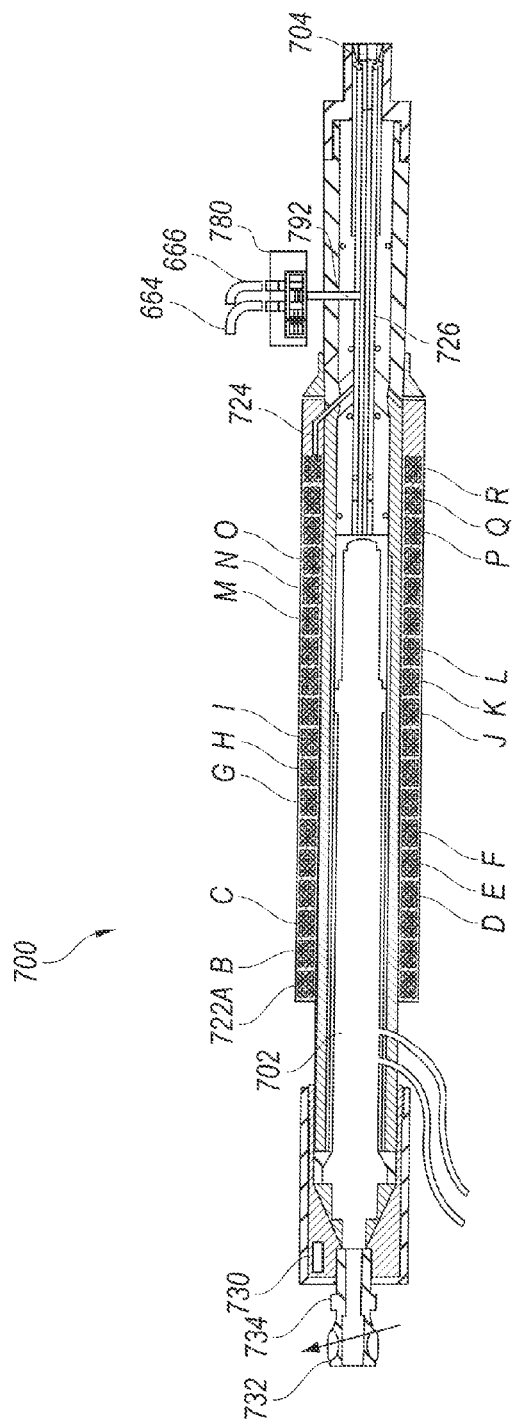
FIG. 12A is a cross-sectional side view of a fuel injector assembly configured in accordance with embodiments of the technology.
Figure 12D:
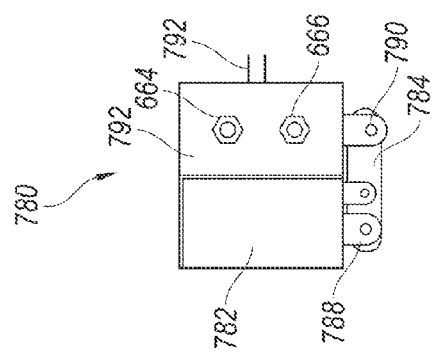
FIG. 12D is an end view of the fuel injector assembly of FIG. 2A.
Figure 12B:
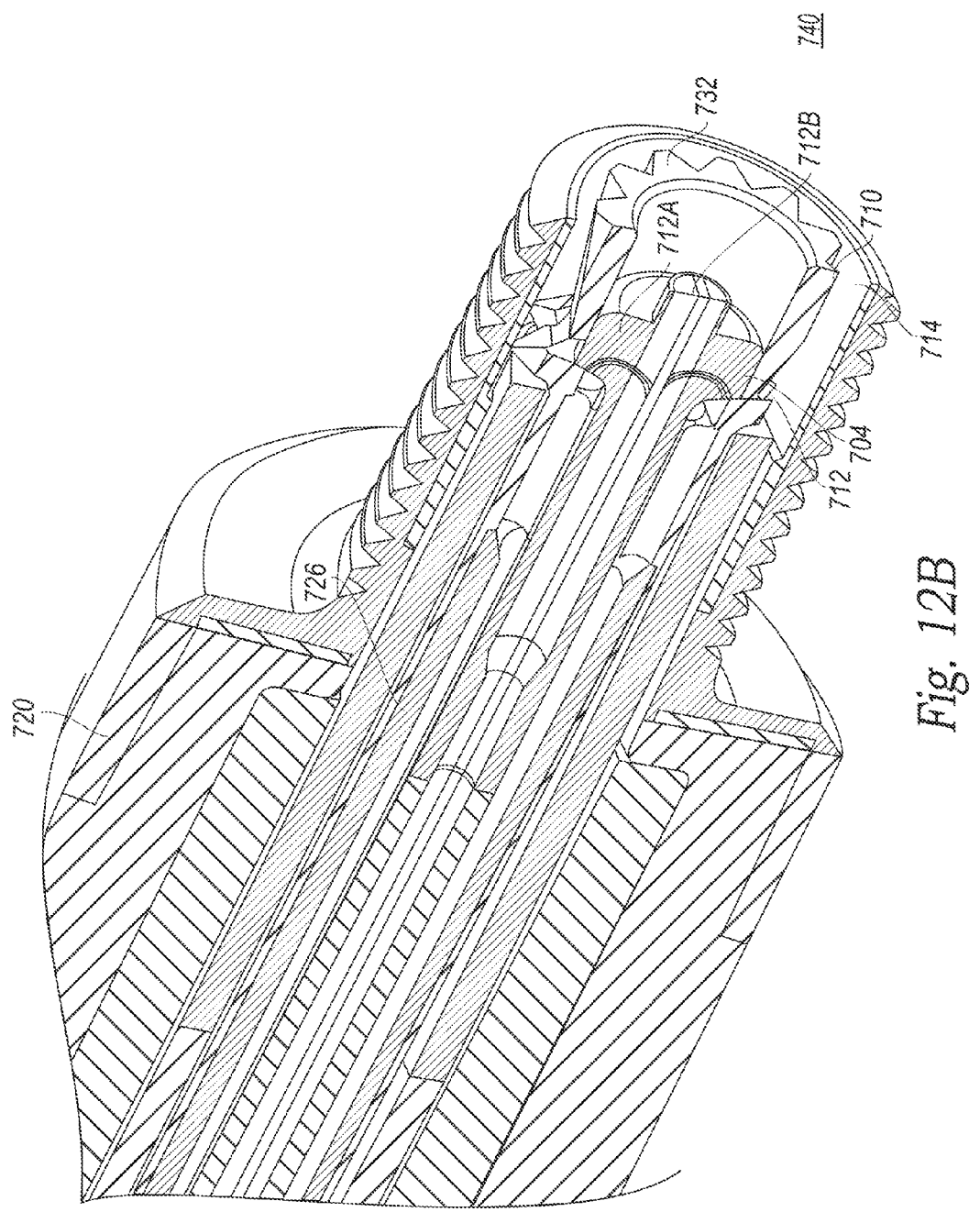
FIGS. 12B and 12C are magnified views of portions of the fuel injector assembly of FIG. 12A configured in accordance with embodiments of the technology.
Figure 12C:
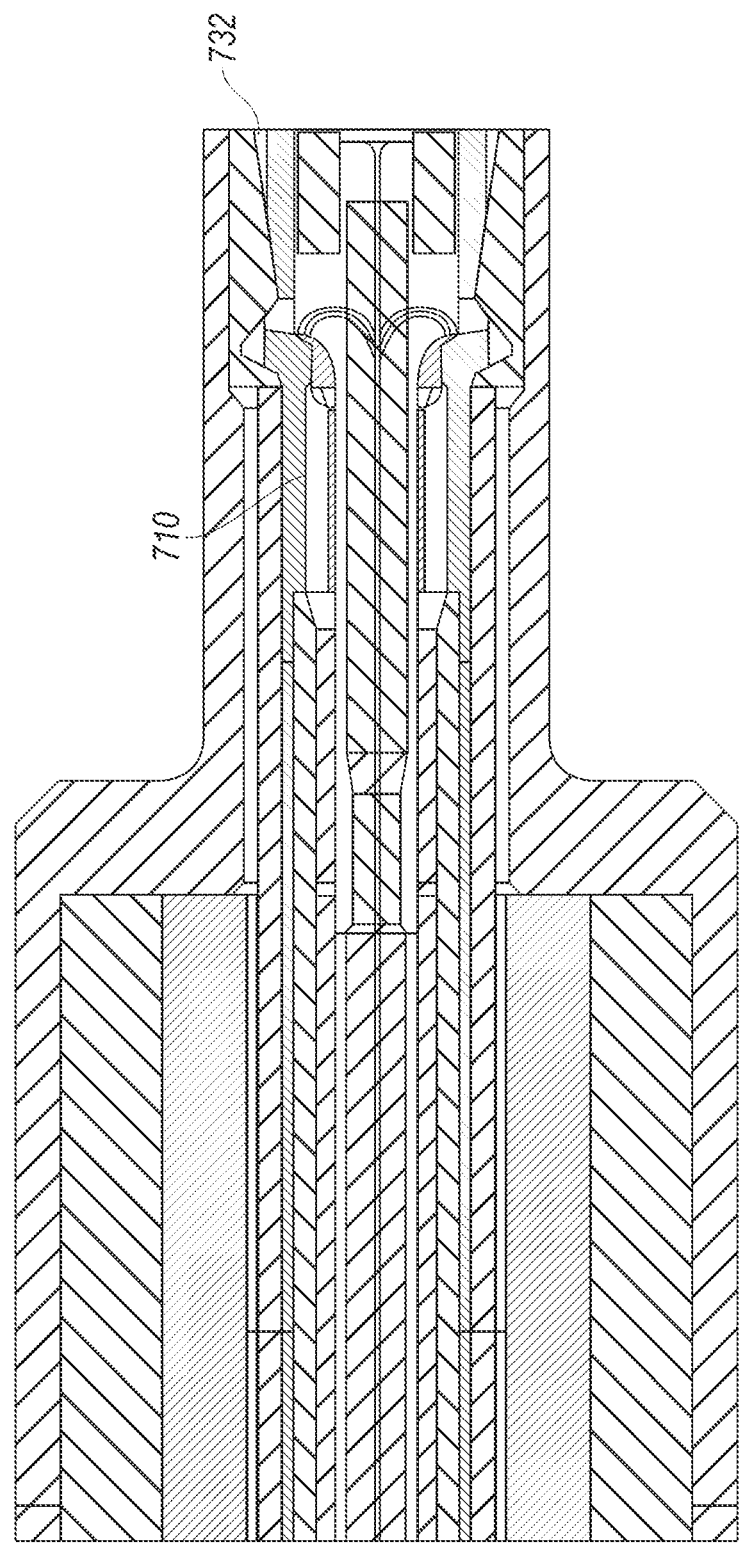

FIG. 12A is a cross-sectional side view of a fuel injector assembly 700 configured in accordance with embodiments of the technology. FIGS. 12B and 12C are magnified views of portions of the injector assembly 700 of FIG. 12A configured in accordance with embodiments of the technology. FIG. 12D is an end view of the injector assembly 700 of FIG. 12A. Referring to FIGS. 12A-12D together, the injector assembly 700 includes several features generally similar and/or different to the injector 1101 described above with reference to FIG. 6. The injector assembly 700 enables operations such as a thermodynamic cycle of engine operation including Joule-Thomson expansively cooled fluid injection during compression of an oxidant, and/or Joule-Thomson expansively heated fluid at or after top dead center (TDC).

In certain embodiments the fuel injector assembly 700 includes or can be coupled to a thermochemical reactor assembly including an accumulator volume for storage of chemical and/or pressure and/or thermal potential energy. Such an accumulator can be utilized for storing potential energy such as chemical, temperature, and pressure contributions to potential energy. One exemplary accumulator stores hot hydrogen at high pressure, such as at temperatures from about 700° C. to 1500° C. (1300 to 2700° F.). Such hydrogen inventory includes hydrogen that has been separated by galvanic proton impetus to deliver pressurized hydrogen into the accumulator volume around a cathode zone after production of such hydrogen in conjunction with an anode zone from a hydrogen donor formula or mixture that may include substances such as ammonia, urea, a fuel alcohol, formic acid, water, oxygen, or various hydrocarbons such as natural gas or other petroleum products that are delivered by a suitable conduit.

Heat from a suitable source such as the exhaust of an engine may be utilized to preheat hydrogen donor substances in heat exchanger arrangements within a suitably reinforced and insulated case as discussed in U.S. Patent Application No. 13/841,548, fild Mar. 15, 2013, now U.S. Pat. No. 8,820,293, entitled "INJECTOR-IGNITER WITH THERMOCHEMICAL REGENERATION," and which is incorporated by reference herein in its entirety. Suitable heat exchange arrangements include systems such as a helical coil surrounding a pressure containment tube or vessel prior to admission of such hydrogen donor fluid into the tubular bore of the accumulator within a tube or pressure vessel. Additional heat may be added by a resistance or inductive heater using electricity from a suitable source such as the regeneratively produced electricity from stopping a vehicle and/or from regenerative shock absorbers and/or suspension springs. Such sources of electricity are also utilized to provide an electrical potential between electrode-anode and another electrode cathode to produce galvanic impetus to separate and deliver hot, pressurized hydrogen into the associated accumulator.

Gases including mixtures not entirely converted to hydrogen such as remnant portions of feedstock fuels, carbon monoxide, carbon dioxide, nitrogen, and/or water vapor etc., can be provided from the accumulator to the injector assembly 700 through a suitably insulated and/or cooled conduit 666. Hot, high pressure hydrogen can be delivered through an insulated conduit 664 to the injector assembly 700.

It can be highly advantageous in certain embodiments to utilize the injector assembly 700 to deliver cooled gases into the combustion chamber of an engine before top dead center (TDC) to perform cooling of the oxidant, such as air, and thus reduce the backwork of compression. This arrangement can provide improved brake mean effective pressure (BMEP) in the operation of the engine. Subsequently, hot hydrogen can be delivered as a high pressure expansion heating substance at or after TDC to increase the BMEP of the engine and improve the combustion characteristics, including acceleration, of the ignition and completion of combustion of fuel delivered through other conduits such as the conduit 666.

The injector assembly 700 can utilize a suitable valve operator such as a pneumatic, hydraulic, electromagnetic, magnetostrictive or piezoelectric assembly 702 to control the opening and/or closing of a fuel control valve 704 which is shown in the magnified views of FIGS. 12B and 12C. Fuels from the non-hydrogen fluid accumulator may be cooled. In some embodiments, the cooled fuels can achieve temperatures that approach cryogenic methane or hydrogen in instances that a suitable fuel tank is utilized for such storage.

At selected times, such as during the compression cycle of oxidant in the host engine, pressurized fluid from the conduit 666 can be selected by a rapid response valve assembly 780 which can be actuated by a suitably separated and/or insulated pneumatic, hydraulic, electromagnetic, magnetostrictive or piezoelectric actuator 782 to rapidly produce output through a first linkage 788 and mechanically amplified stroke through a second linkage 790 by lever linkage 784 to move a suitable valve, such as a spool valve within a case 792, to deliver expansively cooling fluid during oxidant compression and expansively heating fluid at or after TDC (e.g. hot high pressure hydrogen from the hot accumulator) through the insulated conduit 664. Similarly, rapid repositioning of the shuttle valve by the mechanical amplifier and/or dampener delivers suitably conditioned (e.g., cooled) fluid through the conduit 666 to a conduit within the case 792 for injection controlled by the valve 704 as shown.

The valve assembly 780 is provided at a suitable location as shown for purposes of functionally isolating fluids (e.g. hot, corrosive, or cold fluids) provided to the combustion chamber of an engine as controlled by the operation of the valve 704. At other selected times, another fluid that is delivered through a fitting 734 from a pressure regulator 732 may be used to cool and/or provide deliveries of incipient crack repair agents such as activated monomers and/or precursors for polymeric, glass, ceramic, or composite insulation systems 720 which may include components that also may provide functions such as charge storage (e.g. capacitors).

In operation, the valve 704 is opened and/or closed by the piezoelectric assembly 702. In some embodiments the piezoelectric assembly 702 comprises a piezoelectric stack that produces an output that is mechanically amplified (e.g., using any of the mechanical stroke modifiers described above). Alternately, the piezoelectric stack may be selected with sufficiently long actuation stroke. In both such arrangements, the piezoelectric assembly 702 can be controlled by adaptively adjusted applied voltage to open the valve 704 variable distances to control the rate of fluid flow such as fuel delivery into the combustion chamber of the engine. Instrumentation may be provided and/or relayed to a controller (e.g., a microcontroller) 730 by relay components 712 such as light pipes or fiber optics 712A. The relay components 712 can monitor the opening from the valve seat portion. An electrode component 710 can control the piezoelectric assembly 702 and/or the flow delivered past the valve 704 as shown. Additional instrumentation fibers 712B can monitor and relay combustion chamber information to the controller 730 such as temperature, pressure, injected fluid penetration and patterns including intake, compression, combustion, and exhaust events. Such instrumentation fibers 712B may be routed through spaces available or provided within the mechanical amplifier and/or dampening systems such as described above and may include sheathing to protect against wear or fretting by relative motion components.

Injection and/or ignition of fuel delivered through the valve 704 can be through the annular pathway and/or channels between the pressure regulator 732, which may produce swirl or other shapes of fluid such as fuel projections into the combustion chamber 740. Ignition may be selected from spark, ion thrusting, and/or corona discharge within combustion chamber 740. Illustratively, ion production and acceleration starting with ion current development between relatively small gaps between one or more relay components 712 and a suitably shaped counter electrode 714 provides ion thrusting of adaptively adjusted ion populations by the controller 730 in response to information such as may be relayed through filaments or fibers 712A and/or 712B. Corona discharge may follow such ion launch patterns for further ion production and/or ionizing radiation accelerated initiation and/or completion of combustion operations.

Low voltage electricity may be utilized to operate the injector assembly 700 and may be supplied from suitable circuits within the controller 730 or at other suitable locations including production of high voltage for spark, ion thrusting and/or corona ignition by selected transformer elements and cells of an assembly 722A-722R as shown with abbreviated designations of such inductive windings. High voltage can be delivered through one or more insulated conductors 724 to a conductor tube 726 and thus to the electrode component 710 as shown for such applications.

Figure 13:
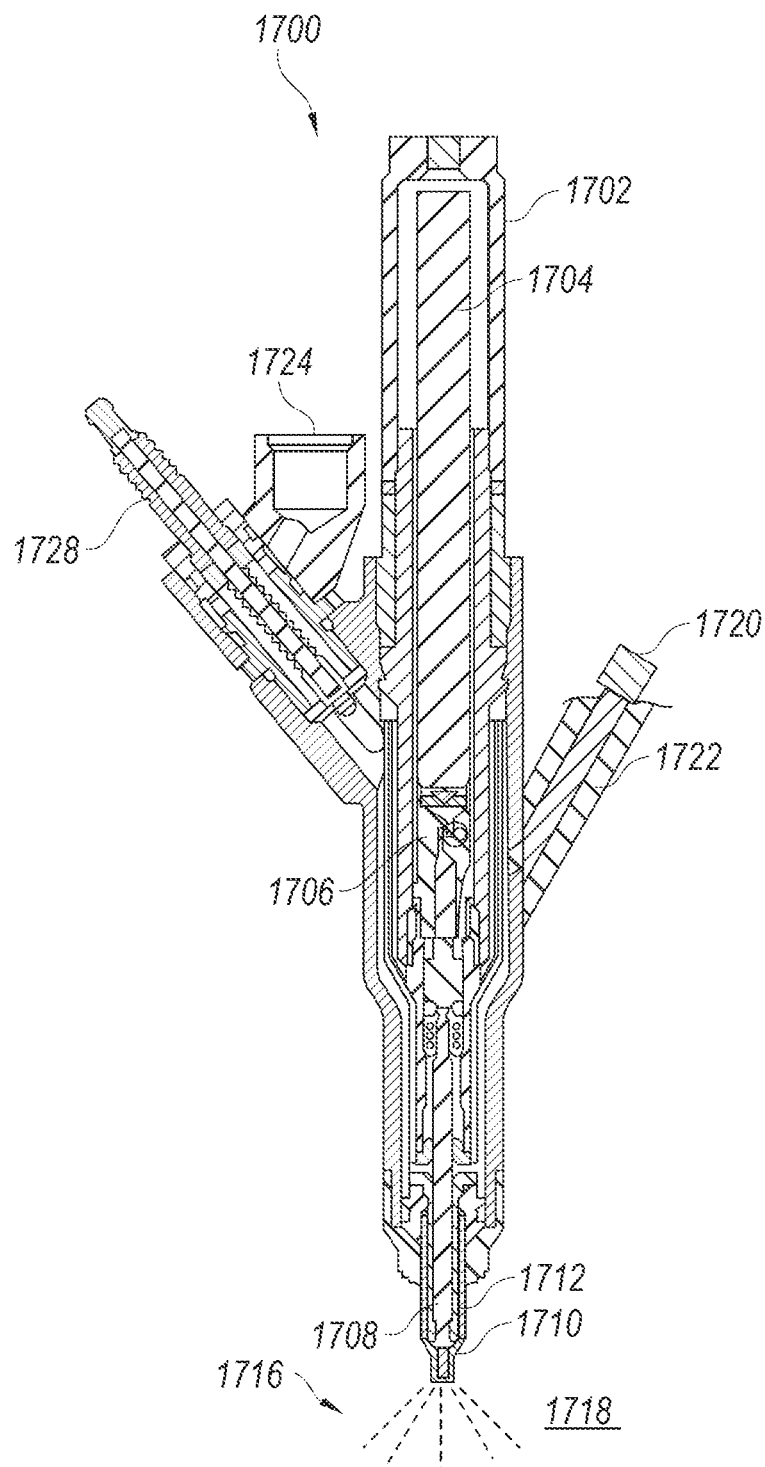
FIG. 13 is a cross-sectional side view of a combined fuel-injection and ignition system configured in accordance with embodiments of the technology.

FIG. 13 is a cross-sectional side view of a combined fuel-injection and ignition system 1700 configured in accordance with embodiments of the technology. In some embodiments, the system 1700 can be used to convert existing engines to net operation on hydrogen in a new thermodynamic cycle that achieves much greater efficiency than traditional diesel engines or fuel cells. The system 1700 can further be used in new production engines.

In some embodiments, the system 1700 includes a case 1702 that compressively loads a valve actuator 1704 (e.g., piezoelectric). In some embodiments, the case 1702 is at least partially made of steel, stainless steel, glass, or super alloy. The actuator 1704 is coupled to a mechanical stroke modifier 1706 (e.g., amplifier and/or dampener) having several features generally similar to any of the mechanical stroke modifiers described above.

The mechanical stroke modifier 1706 can be employed in the manner described above with reference to FIG. 11 for operation as an electrical and thermal barrier assembly having wheels, pinions, and gears. The amplified motion of the actuator 1704 provides valve opening for control of fuel flow from a port 1720 and/or fitting 1724, through an annular passageway within coaxial extended electrode components 1708, 1710 (i.e., the valve) and into a spray pattern 1716 penetrating a combustion chamber 1718.

Another advantage of the amplifying and electrical and/or thermal insulating capabilities of the system 1700 is that the fuel injector assembly 700 shown in FIG. 12A can utilize the mechanical stroke modifier 1706 to convey force in various directions. Using the mechanical stroke modifier 650 of FIG. 11 as another example, the mechanical stroke modifier 650 can apply force in any direction that is more or less tangential to the rims of the pinion, gear, and wheels 602, 604, 606, and/or 620 including push or pull forces. Referring again to FIG. 8, in some embodiments the operation of the actuator 1704 can produce inward motion through a valve sleeve 1712 to provide an annular passageway past the extended electrode component 1708. In other embodiments, the operation of the actuator 1704 can produce outward motion through the extended electrode component 1708 to provide an annular passageway past the valve sleeve 1712.

The electrical insulating and heat blocking capabilities of the mechanical stroke modifier 1706 can allow heated, high pressure fuel gases such as heated hydrogen or hydrogen-characterized mixtures (as illustrated by representative Equations 8 and 9) to be provided through a conduit connected by a fitting 1724 within an insulator 1722. The fuel gases can be delivered through suitable internal passageways to an annular gap between the extended electrode components 1708 and 1710 to produce Lorentz thrusting of oxidant and/or fuel ions in the spray pattern 1716 and/or with subsequent corona ignition in the spray pattern 1716. This embodiment also enables occasional flow of cooler fuel fluids through a fitting 1724 to intermittently cool the internal passageways and remove heat from the actuator 1704 and other components, such as the mechanical stroke modifier 1706. This can maintain high dielectric strength capabilities of an insulator 1728 and other components within the case 1702, and in some instances can include the dielectric fluid admitted through the fitting 1724 as shown.

U.S. patent application Ser. No 13/839,178, entitled "HYDRAULIC DISPLACEMENT AMPLIFIERS FOR FUEL INJECTORS," and filed on or before Mar. 15, 2013, and U.S. patent application Ser. No. 13/842,636, entitled "SYSTEMS AND METHODS FOR PROVIDING MOTION AMPLIFICATION AND COMPENSATION BY FLUID DISPLACEMENT,", and filed on or before Mar. 15, 2013, are incorporated by reference herein in their entireties.

Certain embodiments disclosed herein generally relate to a motion modifier (e.g., hydraulic displacement amplifiers and/or dampeners in fuel injectors). Particular embodiments are directed to hydraulic displacement amplifiers and/or dampeners for use in the direct injection of gaseous fuels into internal combustion engines of multiple cylinders, sizes and compression ratios. In some embodiments, a gaseous fuel injector includes a piezoelectric actuator, a working volume reservoir adjustable between a first volume and a second volume smaller than the first volume, and a combustion chamber valve in communication with the working volume reservoir and movable between a closed configuration when the working volume reservoir comprises the first volume and an open configuration when the working volume reservoir comprises the second volume. The gaseous fuel injector further includes a hydraulic displacement amplifier and/or dampener in operable connection with the actuator. The hydraulic displacement amplifier and/or dampener can have a plurality of pistons in communication with the working volume reservoir that are configured to adjust the working volume reservoir from the first volume to the second volume.

Specific details of several embodiments of the technology are described below with reference to FIGS. 14-15B. Other details describing well-known structures and systems often associated with motion modifiers, amplifiers, dampeners, fuel injection systems, and ignition systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 14-15B.

FIG. 14 is a schematic cross-sectional side view of an injector 2101 configured in accordance with embodiments of the technology. The injector 2101 is configured to inject fuel into a combustion chamber 2105 and utilize a motion modifier (e.g., hydraulic displacement amplifier 2150) to increase the pressure of gaseous fuel entering the combustion chamber and/or dampener to decrease the pressure of gaseous fuel entering the combustion chamber. In further embodiments, the fuel is a liquid, a gaseous/liquid combination, a partial solid or slurry, or other material. The motion modifier (e.g., hydraulic displacement amplifier 2150) is schematically illustrated in FIG. 14 and can be positioned at any location on the injector 2101 and coupled to any of the features described in detail below. Moreover, in certain embodiments the motion modifier (e.g., hydraulic displacement amplifier 2150) can be integral with one or more of the valve actuating components described in detail below. Furthermore, although several of the additional features of the illustrated injector 2101 described below are shown schematically for purposes of illustration, several of these schematically-illustrated features are described in detail below with reference to various features of embodiments of the disclosure. Accordingly, the relative location, position, size, orientation, etc., of the schematically-illustrated components of the Figures are not intended to limit the present disclosure.

In the illustrated embodiment, the injector 2101 includes a casing or body 2113 having a middle portion 2117 extending between a base portion 2115 and a nozzle portion 2119. The nozzle portion 2119 extends at least partially through a port in an engine head 2107 to position the nozzle portion 2119 at the interface with the combustion chamber 2105. The injector 2101 further includes a fuel passage or channel 2141 extending through the body 2113 from the base portion 2115 to the nozzle portion 2119. The channel 2141 is configured to allow fuel to flow through the body 2113. The channel 2141 is also configured to allow other components, such as a valve operator assembly 2131, an actuator 2123, instrumentation components, and/or energy source components of the injector 2101 to pass through the body 2113. According to additional features of the illustrated embodiment, the nozzle portion 2119 can include one or more ignition features for generating an ignition event for igniting the fuel in the combustion chamber 2105. For example, the injector 2101 can include any of the ignition features disclosed in U.S. patent application Ser. No. 12/841,170 entitled "INTEGRATED FUEL INJECTORS AND IGNITERS AND ASSOCIATED METHODS OF USE AND MANUFACTURE," filed Jul. 21, 2010, which is incorporated herein by reference in its entirety.

In certain embodiments, the actuator 2123 can be a cable, stiffened cable, or rod that has a first end portion that is operatively coupled to a flow control device or valve 2121 carried by the nozzle portion 2119. The actuator 2123 can be integral with the valve 2121 or a separate component from to the valve 2121. As such, the flow valve 2121 is positioned proximate to the interface with the combustion chamber 2105. Although not shown in FIG. 1, in certain embodiments the injector 2101 can include more than one flow valve, as well as one or more check valves positioned proximate to the combustion chamber 2105, as well as at other locations on the body 2113. For example, the injector 2101 can include any of the valves and associated valve actuation assemblies as disclosed in the patent applications incorporated by reference above.

The position of the flow valve 2121 can be controlled by the valve operator assembly 2131. For example, the valve operator assembly 2131 can include a plunger or driver 2125 that is operatively coupled to the actuator 2123. The driver 2125 can be a prime mover such as a piezoelectric, magnetostrictive, electromagnetic, electromechanical, pneumatic, or hydraulic force generator. The actuator 2123 and/or driver 2125 can further be coupled to a processor or controller 2129. As explained in detail below with reference to various embodiments of the disclosure, the driver 125 and/or actuator 2123 can respond to the controller 2129. The controller 2129 can be positioned on the injector 2101 or remotely located away from the injector 2101. The controller 2129 and/or the driver 2125 are configured to rapidly and precisely actuate the actuator 2123 to inject fuel into the combustion chamber 2105 by moving the flow valve 2121 via the actuator 2123. For example, in certain embodiments, the flow valve 2121 can move outwardly (e.g., toward the combustion chamber 2105) and, in other embodiments, inwardly (e.g., away from the combustion chamber 2105) to meter and control the injection of the fuel. Moreover, the driver 2125 can tension the actuator 2123 to retain the flow valve 2121 in a closed or seated position, and the driver 2125 can relax or relieve the tension in the actuator 2123 to allow the flow valve 2121 to inject fuel. In other embodiments, the flow valve 2121 may be opened and closed depending on the pressure of the fuel in the body 2113 without the use of an actuator cable or rod. Additionally, although only a single flow valve 2121 is shown at the interface of the combustion chamber 2105, in other embodiments the flow valve 2121 can be positioned at other locations on the injector 2101 and can be actuated in combination with one or more other flow valves or check valves.

The injector 2101 can further include a sensor 2127 and/or transmitting component for detecting and relaying combustion chamber properties such as temperatures and pressure, and providing feedback to the controller 2129. The sensor 2127 can be integral to the valve 2121, the actuator 2123, and/or the nozzle portion 2119 or a separate component that is carried by any of these portions of the injector 2101. In one embodiment, the actuator 2123 can be formed from fiber optic cables or insulated transducers integrated within a rod or cable, or can include other sensors to detect and communicate combustion chamber data. Although not shown in FIG. 14, in other embodiments, the injector 2101 can include other sensors or monitoring instrumentation located at various positions on the injector 2101. For example, the body 2113 can include optical fibers integrated into the material of the body 2113. In addition, the flow valve 2121 can be configured to sense or carry sensors to transmit combustion data to one or more controllers 2129 that are associated with the injector 2101. This data can be transmitted via wireless, wired, optical or other transmission mediums to the controller 2129 or other components. Such feedback enables extremely rapid and adaptive adjustments for desired fuel injection factors and characteristics including, for example, fuel delivery pressure, fuel injection initiation timing, fuel injection durations for production of multiple layered or stratified charges, combustion chamber pressure and/or temperature, the timing of one, multiple or continuous plasma ignitions or capacitive discharges, etc. For example, the sensor 2127 can provide feedback to the controller 2129 as to whether the measurable conditions within the combustion chamber 2105, such as temperature or pressure, fall within ranges that have been predetermined to provide desired combustion efficiency. Based on this feedback, the controller 2129 in turn can direct the motion modifier (e.g., hydraulic displacement amplifier 2150) to manipulate the frequency and/or degree of flow valve 2121 actuation.

The motion modifier (e.g., hydraulic displacement amplifier 2150) can take on numerous forms according to different embodiments of the disclosure and can transfer or modify (i.e., amplify) the motion of the driver 2125, the actuator 2123, the flow valve 2121, and/or to other components of the fuel injector 2101. In another embodiment, the motion modifier (e.g., hydraulic displacement amplifier 2150) and/or dampener transfers motion directly to the actuator 2123 by any of the means described above. The actuator 2123 in turn opens the flow valve 2121 in a stroke responsive to the motion transfer, thereby altering the fuel distribution rate and/or pressure. In some embodiments, the motion modifier (e.g., hydraulic displacement amplifier 2150) transfers motion to the flow valve 2121 directly.

FIG. 15A is a cross-sectional side view of a motion modifier (e.g., hydraulic displacement amplifier 2250) configured in accordance with embodiments of the technology. FIG. 15B is a magnified view of an amplification region 2290 of the motion modifier (e.g., hydraulic displacement amplifier 2250) of FIG. 15A. Referring to FIGS. 15A and 15B together, the motion modifier (e.g., hydraulic displacement amplifier 2250) can include an anvil 2264, an upper piston 2265, and a lower piston 2266 in hydraulic communication with the upper piston 2265. The pistons 2265, 2266 can be movable to affect a first working volume 2275a and a second working volume 2275b (collectively, a "working volume 2275") in the motion modifier (e.g., hydraulic displacement amplifier 2250). The working volume 275 can communicate with reservoir volumes of hydraulic fluid 2276, 2277, 2278a, 2278b (collectively, "reservoir volume") by means of a check valve 2272 and diametric leakage gaps 2280a, 2280b (collectively, "diametric gaps 2280") around the upper piston 2265 and lower piston 2266, respectively. In still further alternative embodiments, the diametric gaps 2280 can be eliminated, minimized, or reduced by adding active sealing, such as o-ring grooves, or vulcanized sealing systems. An orifice may then be included that precisely controls the flow rate into the appropriate reservoir volume from the working volume 2275. In further embodiments, the piston arrangement may be altered such that instead of unidirectional motion amplification, the motion is amplified and reversed. In some embodiments, an orifice can be controllably varied by a suitable component such as a piezoelectric element.

In various embodiments, the check valve 2272 can take on alternate forms, such as a ball valve, flapper valve, pintle valve, or spool type valve. Alternatively, the reservoir volume can be sealed by alternative means, such as with diaphragms, bellows, o-rings, or vulcanized sealing systems. In various embodiments, the filling of hydraulic fluid into the device may be accomplished by means of vacuum filling, high temperature baking, vibratory shaking, or other viable means to achieve a fluid-filled device with minimized air volume allowed. In some embodiments, the motion modifier (e.g., hydraulic displacement amplifier 2250) can be sub-assembled in a self-contained state by adding retaining rings 2273a, 2273b, and a shell 2268.

In operation, the motion modifier (e.g., hydraulic displacement amplifier 2250) can transfer and/or amplify motion from a valve actuator (e.g., the actuator 2123 shown in FIG. 14) to an injector valve (e.g., to a valve pin on the flow valve 2121 shown in FIG. 14). For efficient direct injection of gaseous fuels, a fast-acting actuator such as a piezoelectric multilayer motion generator may be used. The actuator can initiate an initial displacement 2261 that creates a displacement of the anvil 2264 and the upper piston 2265; the displacement momentarily reduces the working volume 2275, thus increasing the pressure within the working volume 2275. This pressure can increase until a static force 2284 from the injector valve pin is overcome. The pressure created will also exert an increased force 2262 back to the upper piston 2265 and thus the actuator (not shown). At this point, the lower piston 2266 is displaced by a distance 2263 and the working volume 2275 is restored.

The motion modifier (e.g., hydraulic displacement amplifier 2250) can amplify or dampen motion between the valve actuator to the injector valve according to an amplification or dampening ratio. The amplification or dampening ratio R is, ideally, the ratio of the upper piston 2265 hydraulic area $A_1$ divided by the lower piston 2266 hydraulic area $A_2$, or $R=A_1/A_2$, where a hydraulic area A is the cross-sectional area of each piston in this arrangement. The ideal ratio R, however, assumes that there is no hydraulic fluid bulk modulus effects, volumetric influences, or leakages around the pistons 2265, 2266 or other leak points. The working volume 2275, fluid bulk modulus, piston diameters, and diametric gaps 2280 can be carefully chosen to achieve the desired amplification or dampening ratio. The upper piston 2265 and lower piston 2266 can have different cross-sectional areas or similar cross-section areas.

The motion modifier (e.g., hydraulic displacement amplifier 2250) can further serve to reduce operational constraints on the fuel injector. In various embodiments, the motion modifier (e.g., hydraulic displacement amplifier 2250) can absorb effects due to thermal growth, thermal shrinkage, part geometry changes due to loads, gravitational effects, and other conditions that would limit the working parameters or actuator functionality of the injector. For example, in some embodiments both the upper piston 2265 and the lower piston 2266 are preloaded with a first spring 2269 and a second spring 2270, respectively, such that the working volume 2275 is maintained without the influence of gravity or other effects. Alternatively, the first and second springs 2269, 2270 may be helical compression springs, wave springs, belleville washers, machined springs, urethane bushings, one or more magnets, or other suitable devices. In some embodiments, the motion modifier (e.g., hydraulic displacement amplifier 2250) further includes at least one of a magnet, pneumatic cylinder, or spring coupled to at least one of the plurality of pistons and configured to return the motion modifier (e.g., hydraulic displacement amplifier 2250) to a starting position at the end of a motion modifier (e.g., hydraulic displacement amplification and/or dampening) cycle.

In further embodiments, thermal effects can be mitigated by the check valve 2272, which can permit one-way flow of hydraulic fluid from the reservoir volume of hydraulic fluid to the working volume 2275 when a pressure differential is created due to thermal effects, changes to geometry, or other effects and conditions that the injector valve system may experience in operation. When pressure is created in the working volume 2275, the pressure will exert a force on the check valve 2272 and force it against a valve seat 2271. This will cause leakage through the diametric gaps 2280 around the pistons 2265, 2266 that will slowly reduce the pressure in the working volume 2275 to normal conditions. In some embodiments, the reservoir volume is sufficiently larger than the working volume 2275 in order to absorb leakage volumes of hydraulic fluid from the working volume 2275. It can be appreciated that other means of containing reservoir volumes can be accomplished by means of diaphragms, o-ring seals 2274, bellows, etc. In certain applications, the hydraulic fluid can be the same or a refined version of the liquid fuel that is suitable for the host engine. For example, in some embodiments, hydraulic fluids such as diesel or jet fuel, gasoline, and/or various fuel alcohols can be used. In some embodiments, the reservoir volume can extend around the actuator (not shown) and provide a means of hydraulic damping to the actuator assembly.

The motion modifier (e.g., hydraulic displacement amplifier) can offer several advantages over traditional systems. In some embodiments, the motion modifier (e.g., hydraulic displacement amplifier 2250) can be used as part of an injector for a dedicated natural gas or gaseous fueling system for the automotive, heavy duty, or off road markets. For example, the hydraulically-pressurized gas can reduce injection time. This can be useful for a diesel engine (compression ignition) type of application, where the direct injection of a gaseous fuel traditionally takes too long or the injector cannot deliver enough gaseous fuel due to the low density characteristics of gaseous fuels. In other cases, the fuel system need not be a dedicated natural gas system, as diesel fuel can be used as a supplement and catalyst for combustion. In some applications, diesel fuel, gasoline, or other liquid fuel serves as an expendable amplifier or dampening working fluid and leakage can be added to the injected fuel. In such instances, replenishing supplies of such fuel working fluids can be added cyclically or occasionally to one or more of the reservoirs as previously described and/or to larger versions of such reservoirs.

Because of the low density characteristics of gaseous fuel, traditional systems require a very large valve arrangement and/or a high injector valve lift to sufficiently inject the required quantity of fuel in the amount of time needed for compliant emissions, burn characteristics, heat release, and power needs. In the case of a multilayer piezoelectric stack assembly, the force exerted is very high and can overcome a larger valve sealing arrangement, but is limited on available displacement. The present technology overcomes the displacement limitations of a piezoelectric multilayer actuator by amplifying the motion to the valve arrangement such that the injector has the ability to inject the required quantity of fuel in the amount of time allowable.

U.S. patent application Ser. No. 13/843,197, entitled "MECHANICAL MOTION AMPLIFICATION FOR NEW THERMODYNAMIC CYCLES,", and filed on or before Mar. 15, 2013, and U.S. patent application Ser. No. 13/842,636, entitled "SYSTEMS AND METHODS FOR PROVIDING MOTION AMPLIFICATION AND COMPENSATION BY FLUID DISPLACEMENT,", and filed on or before Mar. 15, 2013, are incorporated by reference herein in their entireties.

From the foregoing, it will be appreciated that specific embodiments of the invention have been described herein for purposes of illustration, but that various modifications may be made without deviating from the scope of the invention. Accordingly, the invention is not limited except as by the appended claims.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

I claim:

1. An injector for introducing fuel into a combustion chamber, the injector comprising:
    an injector body comprising a base portion configured to receive fuel into the body and a valve coupled to the body, wherein the valve is movable to an open position to introduce fuel into the combustion chamber;
    a valve operator assembly, the valve operator assembly comprising a driver, a movable component, a displacement amplifier having an elastomeric component coupled to the valve, and a piston having a first end in contact with the movable component and second end in contact with the elastomeric component,
    wherein the driver applies a force upon the movable component to axially move the piston by a first displacement and wherein the elastomeric component is configured to transfer motion of the piston by the first displacement to the valve and axially move the valve by a second displacement greater than the first displacement.

2. The injector of claim 1, wherein the movable component is preloaded against a first end of the piston and a second end of the piston is preloaded against the elastomeric component.

3. The injector of claim 1, wherein the elastomeric component is deformable upon application of the force on the piston by the driver and is configured to return to an original dimension upon release of the force.

4. The injector of claim 3, wherein a ratio of a cross-sectional area of the piston to a cross-sectional area of a valve stem in contact with the elastomeric component determines a displacement amplification factor.

5. The injector of claim 1, wherein the second displacement is a range of 1.5 to 10 times greater than the first displacement.

6. The injector of claim 1, wherein the elastomeric component comprises two or more materials.

7. The injector of claim 1, wherein the elastomeric component comprises a spring.

8. The injector of claim 1, wherein the driver comprises a piezoelectric assembly and the first displacement is controlled by a magnitude of voltage applied to the piezoelectric assembly.

9. An injector for introducing fuel into a combustion chamber, the injector comprising:
    an injector body comprising a base portion configured to receive fuel into the body and a valve coupled to the body, wherein the valve is movable to an open position to introduce fuel into the combustion chamber;
    a valve operator assembly, the valve operator assembly comprising a driver, a movable component, a displacement amplifier having a ferrofluid filled component coupled to the valve, and a piston having a first end in contact with the movable component and second end in contact with the ferrofluid filled component,
    wherein the driver applies a force upon the movable component to axially move the piston by a first displacement and wherein the ferrofluid filled component is configured to transfer motion of the piston by the first displacement to the valve and axially move the valve by a second displacement greater than the first displacement.

10. The injector of claim 9, wherein the piston comprises one or more magnets configured to orient particles of the ferrofluid filled component.

11. The injector of claim 10, wherein the one or more magnets are configured to provide magnetic attraction of the valve to a closed position as the piston returns to the closed position.

12. The injector of claim 11, wherein the driver comprises a piezoelectric assembly and the first displacement is controlled by a magnitude of voltage applied to the piezoelectric assembly.

* * * * *